(12) United States Patent
Ramoutar et al.

(10) Patent No.: US 12,095,580 B2
(45) Date of Patent: Sep. 17, 2024

(54) CONFERENCING PLATFORM INTEGRATION WITH AGENDA GENERATION

(71) Applicant: DocuSign, Inc., San Francisco, CA (US)

(72) Inventors: Anthony Joseph Ramoutar, San Francisco, CA (US); Billy Travis Williams, Alameda, CA (US); David Soh, Fullerton, CA (US)

(73) Assignee: DocuSign, Inc., San Francisco, CA (US)

( * ) Notice: Subject to any disclaimer, the term of this patent is extended or adjusted under 35 U.S.C. 154(b) by 0 days.

(21) Appl. No.: 17/977,452

(22) Filed: Oct. 31, 2022

(65) Prior Publication Data

US 2024/0146559 A1    May 2, 2024

(51) Int. Cl.
*H04L 12/18* (2006.01)
*G06F 16/93* (2019.01)

(52) U.S. Cl.
CPC .......... *H04L 12/1822* (2013.01); *G06F 16/93* (2019.01)

(58) Field of Classification Search
CPC .............................. H04L 12/1822; G06F 16/93
See application file for complete search history.

(56) References Cited

U.S. PATENT DOCUMENTS

| | | | |
|---|---|---|---|
| 9,855,785 B1* | 1/2018 | Nagelberg | G06K 19/06028 |
| 11,055,387 B2 | 7/2021 | Gonser et al. | |
| 2006/0106872 A1 | 5/2006 | Leban et al. | |
| 2006/0224430 A1* | 10/2006 | Butt | G06Q 10/063116 705/7.19 |
| 2011/0072362 A1* | 3/2011 | Denner | G06Q 10/109 715/751 |
| 2016/0020909 A1 | 1/2016 | Gardenes Linan | |
| 2016/0048696 A1* | 2/2016 | Follis | G06F 21/645 726/28 |
| 2018/0218339 A1* | 8/2018 | Jenkins | G06Q 30/018 |
| 2021/0368134 A1* | 11/2021 | Rajamani | H04N 7/15 |
| 2023/0103062 A1 | 3/2023 | Matsuzawa | |

OTHER PUBLICATIONS

U.S. Appl. No. 17/977,464, filed Oct. 31, 2022, naming inventors Ramoutar et al.

(Continued)

*Primary Examiner* — Raqiul A Choudhury
(74) *Attorney, Agent, or Firm* — Shumaker & Sieffert, P.A.

(57) ABSTRACT

A centralized document system integrates online document execution and conferencing. Creation of a conference event is detected. The conference event associated with an electronic signature envelope and a plurality of participants. A plurality of actions to be taken with respect to the electronic signature envelope during a conference corresponding to the conference event are determined. For each of one or more actions of the plurality of actions, a corresponding participant is determined based on metadata of the plurality of participants. An agenda comprising a sequence of the plurality of actions is generated. Each action of the sequence has its assigned corresponding participant. Control permissions during the conference corresponding to the conference event are dynamically driver based on the agenda.

20 Claims, 11 Drawing Sheets

(56) References Cited

OTHER PUBLICATIONS

U.S. Appl. No. 17/977,473, filed Oct. 31, 2022, naming inventors Ramoutar et al.
Corrected Notice of Allowance from U.S. Appl. No. 17/977,473 dated Aug. 11, 2023, 2 pp.
Notice of Allowance from U.S. Appl. No. 17/977,473 dated Jul. 26, 2023, 11 pp.

* cited by examiner ns
CONFERENCING PLATFORM INTEGRATION WITH AGENDA GENERATION

TECHNICAL FIELD

The disclosure generally relates to the execution of online documents, and more particularly to integrating a video conferencing platform with the execution of online documents.

BACKGROUND

The ease of performing tasks (e.g., signing documents) involving multiple parties online is accompanied by significant consumption of network bandwidth and computing resources. For example, a meeting during which an agreement is reached between parties may be recorded and stored for recordkeeping. However, recording and storing such a meeting may consume vast amounts of storage resources and is not scalable to produce auditable records of agreement for thousands or millions of users.

SUMMARY

This disclosure pertains to systems and methods for integrating online document execution with video conferencing. Techniques disclosed herein look to provide a mechanism for seamlessly completing the process of executing an online document by multiple participants during a conference (e.g., video meeting). Control permissions to execute the online document in respective signature fields having assigned corresponding participants may automatically be granted to the user device associated with the participant, and the control may automatically transfer from one participant's user device to the next, based on a sequence of actions that are to be performed to complete the execution of the online document.

A user (e.g., host participant) may create a conference event using a conferencing client on their user device for hosting a conference on a video conferencing platform. The conference event may be transmitted as an electronic invitation to a plurality of participants (e.g., invitees, acting participants). The user may associate an electronic signature envelope generated and managed by a centralized document system with the conference event, the envelope to be executed by the acting participants during the conference (e.g., conference for a real property closing, conference for executing a business purchase and sale agreement, etc.).

The envelope associated with the conference event may be a standard template (non-customized) envelope whose signature fields are not populated with the appropriate names of the parties who are to sign the respective signature fields to execute the document. The systems and methods of the present disclosure include techniques to identify actions (e.g., signature fields requiring a party to sign, initial, etc.) in the envelope, identify who is the acting participant for each identified action, and automatically populate respective information (e.g., names, titles, contact information, etc.) corresponding to the respective signature fields in the envelope, based on information regarding the participants to whom the electronic invitation was sent to and further based on metadata regarding the participants. The metadata may include, e.g., organizational hierarchy data corresponding one or more of the participants. The metadata may also include historical signature activity data indicating historical signature activity of one or more of the acting participants. Machine-learned models may be trained to identify the information corresponding to the respective signature fields. The system and methods may further determine a sequence in which to perform the identified plurality of actions of the envelope based on, e.g., rules regarding actions whose execution is a pre-requisite for completing other actions.

After the conference has started, the systems and methods may enable automatic control of presentation of content corresponding to the envelope based on the sequence dictated by the agenda, so that edit permissions to interact with a corresponding signature field (corresponding action) may be granted to a participant based on the agenda dictating who the acting participant for the action is. The systems and methods may monitor input of data from the acting participant with the edit permission, and once the input is received, the system may automatically control to present content corresponding to a next action of the sequence in the envelope, and grant the edit permissions to the acting participant for the next action, and so on, until execution of all actions is completed.

Based on the edit permissions, the acting participant can use their user device to interact with the corresponding signature field in the envelope. In some embodiments, the interaction may be via a peripheral device (e.g., keyboard, mouse, touch screen, etc.). In other embodiments, the interaction may be based on sensor (e.g., microphone, camera) data capturing, e.g., gestures, sounds, and the like, from the user device of the acting participant. The systems and methods may include assent tracking models to determine whether the sensor data indicates assent (or dissent) of the acting participant (e.g., the user nodding or saying "I agree"). The systems and methods may use the captured sensor data to validate the signature of the acting participant for a given signature field. The systems and methods may further generate an auditable data structure based on the captured sensor data indicating assent or dissent for a given action by a given acting participant. The auditable data structure may include a transcript snippet and/or an audio/video snippet corresponding to the input data from the user device of the acting participant. The auditable data structure may be linked to the corresponding action (corresponding signature field) of the envelope (online document) for generating an audit trail for each action of the agenda.

In one embodiment, a method is provided which comprises a plurality of steps. The steps include a step of detecting a creation of a conference event, the conference event associated with an electronic signature envelope and a plurality of participants. The steps further include a step of determining a plurality of actions to be taken with respect to the electronic signature envelope during a conference corresponding to the conference event. Still further, the steps include a step of determining, for each of one or more actions of the plurality of actions, a corresponding participant based on metadata of the plurality of participants. Yet still further the steps include a step of generating an agenda comprising a sequence of the plurality of actions, each action of the sequence having its assigned corresponding participant. And still further, the steps include a step of dynamically driving control permissions during the conference corresponding to the conference event based on the agenda.

In another embodiment, a method is provided which comprises a plurality of steps. The steps include a step of accessing an agenda, the agenda dictating a sequence of actions to occur during a conference including a plurality of participants, the sequence of actions associated with an electronic signature envelope. In addition, the steps include a step of monitoring content shared by a sharing participant of the conference for content corresponding to a given action of the sequence. Still further, the steps include a step of, responsive to detecting the content corresponding to the given action: determining, for the given action, an acting participant, and granting edit permissions to the acting participant, the edit permissions conferring an ability to edit the monitored content. Yet still further, the steps include a step of monitoring input, by the acting participant into the content shared by the sharing participant, for an entry of data corresponding to the given action. Yet still further, the steps include a step of, responsive to detecting the entry of the data during the monitoring, removing the edit permissions from the acting participant. And still further, the steps include a step of automatically modifying the content shared by the sharing participant of the conference to include content corresponding to a next action of the sequence of actions.

In yet another embodiment, a method if provided which comprises a plurality of steps. The steps include a step of accessing an agenda, the agenda dictating a sequence of actions to occur during a conference associated with a plurality of participants, the sequence of actions associated with an electronic signature envelope. In addition, the steps include a step of monitoring content shared by a sharing participant of the conference for content corresponding to a given action of the sequence. Still further, the steps include a step of, responsive to detecting the content corresponding to the given action: determining, for the given action, an acting participant, and monitoring data obtained from sensors of a client device of the acting participant. Still further, the steps include a step of, responsive to detecting the content corresponding to the given action: determining that the data indicates that the acting participant has performed the given action and generating an auditable data structure reflective of the data indicating that the acting participant has performed the given action. And still further, the steps include a step of automatically modifying the content shared by the sharing participant of the conference to include content corresponding to a next action of the sequence of actions.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Centralized Document System Environment

Figure 1:
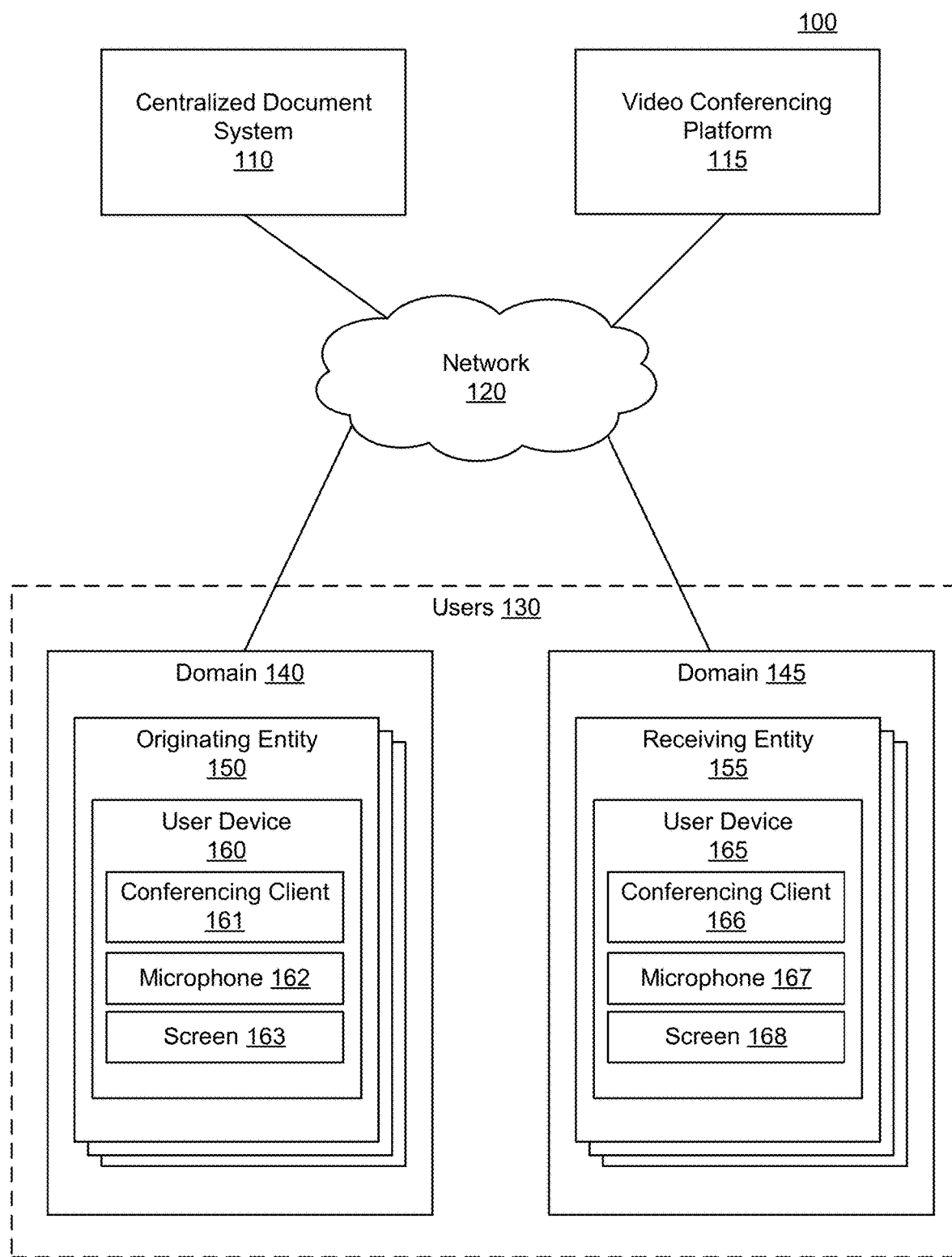
FIG. 1 is a block diagram of a system environment in which a centralized document system operates, in accordance with some embodiments.

FIG. 1 is a block diagram of system environment 100 in which centralized document system 110 operates, in accordance with some embodiments. System environment 100 includes centralized document system 110, video conferencing platform 115, network 120, and users 130 which includes a subset of originating entities 150 associated with domain 140 and a subset of receiving entities 155 associated with domain 145. Each of originating entities 150 and receiving entities 155 can be associated with respective user devices (e.g., user device 160 or user device 165). In alternative configurations, different and/or additional components may be included in system environment 100. Although a centralized document system is frequently referred to herein, a de-centralized document system may also perform similar operations attributed to the centralized document system. For example, the operations can be performed at least in part by software applications of a de-centralized document system installed on individual user devices. Further, although video conferencing platform 115 is depicted as being a component separate from centralized document system 110, some or all of the functionality described herein as being provided by video conferencing platform 115 may be provided instead by centralized document system 110.

Centralized document system 110 is a computer system (or group of computer systems) for storing and managing documents and/or document packages (e.g., electronic signature envelopes) for users 130. Using centralized document system 110, users 130 can collaborate to create, edit, review, negotiate, and execute documents. Centralized document system 110 allows users 130 to generate and modify a document package, which may also be referred to as a "document envelope", "envelope", or "electronic signature envelope." The document package may include at least one document for execution. Centralized document system 110 may provide the at least one document (e.g., a contract, agreement, purchase order, non-disclosure agreement, confidentiality agreement, or other suitable document) in which terms have been agreed upon by two or more domains (e.g., by two or more of users 130 from domain 140 and domain 145) to receiving entity 155 of domain 145 for execution, as described above. Centralized document system 110 may generate an envelope per a request from originating entity 150 of domain 140. In some embodiments, centralized document system 110 enforces a set of document permissions for accessing or modifying the envelope.

Centralized document system 110 enables generation of an agenda and driving control permissions for execution of the electronic signature envelope during a conference (e.g., meeting, video meeting) by users 130 (e.g., participants of a conference) based on the agenda. A conference may be an audio and/or video conference hosted online between two or more users 130. The two or more users may have roles such as a host of the conference and an invitee invited by the host. The two or more users may be referred to as "participants" or "attendees." The terms "host" and "organizer" may be used interchangeably. Centralized document system 110 can be a server, server group or cluster (including remote servers), or another suitable computing device or system of devices. In some embodiments, centralized document system 110 can communicate with user devices 160 and 165 over the network 120 to receive instructions and send envelopes for access on user devices 160 and 165. Centralized document system 110 is discussed in further detail with respect to FIG. 3.

The system environment 100 enables users 130 associated with the centralized document system 110 to create and manage execution of electronic signature envelopes while integrating the execution of the envelopes with a conference hosted by video conferencing platform 115.

Video conferencing platform 115 is a computer system (or group of computer systems) for enabling audio and/or video conferencing between two or more users (e.g., users 130). The video conferencing platform 115 can be a server, server group or cluster (including remote servers), or another suitable computing device or system of devices. The video conferencing platform 115 communicates, over the network 120, with user devices (e.g., the user devices 160, 165) and presents audio and/or video feeds corresponding to the conference between the two or more users 130 on an interface (e.g., conferencing client 161, 166) of each user device. The conference may include users in a negotiation and/or business deal. For example, the conference may include users 130 executing an envelope managed by the centralized document system 110.

The video conferencing platform 115 may record, with the permission of the users of each user device, the audio and/or video feeds. The video conferencing platform 115 may provide the centralized document system 110 with the recording of the audio and/or video feeds. In other embodiments, the video conferencing platform 115 may provide the centralized document system 110 with the audio and/or video feeds in real time. In yet other embodiments, the video conferencing platform 115 may be operable by the centralized document system 110 to control edit permissions to an online document being shared by a sharing participant (e.g., user 130) of the conference. For example, the centralized document system 110 may control the video conferencing platform 115 to selectively grant edit permissions to an acting participant with respect to content (e.g., online document for execution) shared by a sharing participant during the conference. Additional functionality of video conferencing platform is described below in connection with FIG. 2.

Network 120 transmits data within system environment 100. Network 120 may comprise any combination of local area and/or wide area networks, using both wired and/or wireless communication systems, such as the Internet. In some embodiments, network 120 transmits data over a single connection (e.g., a data component of a cellular signal, or Wi-Fi, among others), and/or over multiple connections. In some embodiments, network 120 uses standard communications technologies and/or protocols. For example, network 120 includes communication links using technologies such as Ethernet, IEEE 802.11, 4G, 5G, code division multiple access (CDMA), digital subscriber line (DSL), and the like. Data exchanged over network 120 may be represented using any suitable format, such as hypertext markup language (HTML) or extensible markup language (XML). In some embodiments, network 120 may include encryption capabilities to ensure the security of customer data. For example, encryption technologies may include secure sockets layers (SSL), transport layer security (TLS), virtual private networks (VPNs), and Internet Protocol security (IPsec), among others.

Through network 120, centralized document system 110 can communicate with video conferencing platform 115 and with user devices 160 associated with users 130. A user can represent an individual, group, or other entity that is able to interact with envelopes generated and managed by centralized document system 110. Each user can be associated with a username, email address, or other identifier that can be used by centralized document system 110 to identify the user and to control the ability of the user to view, modify, and otherwise interact with envelopes managed by centralized document system 110. In some embodiments, users 130 can interact with centralized document system 110 through a user account with centralized document system 110 and one or more user devices 160 and 165 accessible to users 130. In some embodiments, users 130 can further interact with video conferencing platform 115 through a user account with video conferencing platform 115 and one or more user devices 160 and 165 accessible to users 130. By integrating the envelopes managed by centralized document system 110 with conferences managed by video conferencing platform 115, users 130 are able to conduct online signing sessions during which envelopes may be executed by multiple participants to the conference in real time.

As described above, a domain (e.g., domains 140 and 145) is a business, group, individual, or the like that is associated with a set of users and one or more envelopes in centralized document system 110. For example, an envelope may originate at domain 140 and be sent to domain 145 for viewing, editing, and execution. In one embodiment, the envelope may be created by originating entity 150 and be sent via centralized document system 110 or via video conferencing platform 115 to receiving entity 155 during the execution of the one or more documents included within the envelope.

In the embodiment of FIG. 1, originating entity 150 from domain 140 can create an envelope via centralized document system 110. In this example, domain 140 includes a set of originating entities 150 which, as used herein, are a subset of users 130 who have user accounts with centralized document system 110. Domain 145 includes a set of receiving entities 155 which, as used herein, are a subset of users 130 who have user accounts with centralized document system 110. The envelope is sent by centralized document system 110 for review and execution by a receiving entity of domain 145.

A user device (e.g., user devices 160 and 165) is a computing device capable of receiving user input as well as transmitting and/or receiving data to centralized document system 110 and to video conferencing platform 115 via network 120. For example, a user device can be a desktop or a laptop computer, a smartphone, tablet, or another suitable device. Each user device may have a microphone (e.g., microphones 162 and 167) for receiving audio during a conference. Although not depicted, users may also use peripheral microphones coupled to user devices, where audio can be captured by the peripheral microphones and communicated to video conferencing platform 115 via user devices coupled to the peripheral microphones. Each user device may have a screen (e.g., screens 163 and 168) for displaying content (e.g., videos, images, content items, or online documents to be executed) during a conference. Although not depicted, users may also use peripheral displays coupled to user devices, where the content displayed during a conference is presented on the peripheral displays. Example peripheral displays include projectors, virtual reality (VR) or augmented reality (AR) headsets, computer monitors, smart televisions, or any suitable peripheral display communicatively coupled to a user device to display conference content. Although not depicted, each user device may have other peripheral devices (e.g., keyboard, mouse, touch screen, etc.).

User devices are configured to communicate via network 120. In one embodiment, a user device executes applications allowing a user of the user device to interact with centralized document system 110 and with video conferencing platform 115. For example, a user device can execute a browser application to enable interaction between the user device and video conferencing platform 115 and centralized document system 110 via network 120. As another example, user devices can store and/or execute conferencing clients (e.g., conferencing clients 161 and 166), which can be software applications allowing users to create and participate in conferences (e.g., teleconferences or video conferences) hosted by video conferencing platform 115, where the conferences may include signing sessions during which envelopes managed by centralized document system 110 may be executed by multiple participants (e.g., users 130) to the conference. In some embodiments, a single user can be associated with multiple user devices, and/or one user device can be shared between multiple users who may, for example, log into a personal account on the user device to access centralized document system 110 and/or video conferencing platform 115.

Video Conferencing Platform

Figure 2:
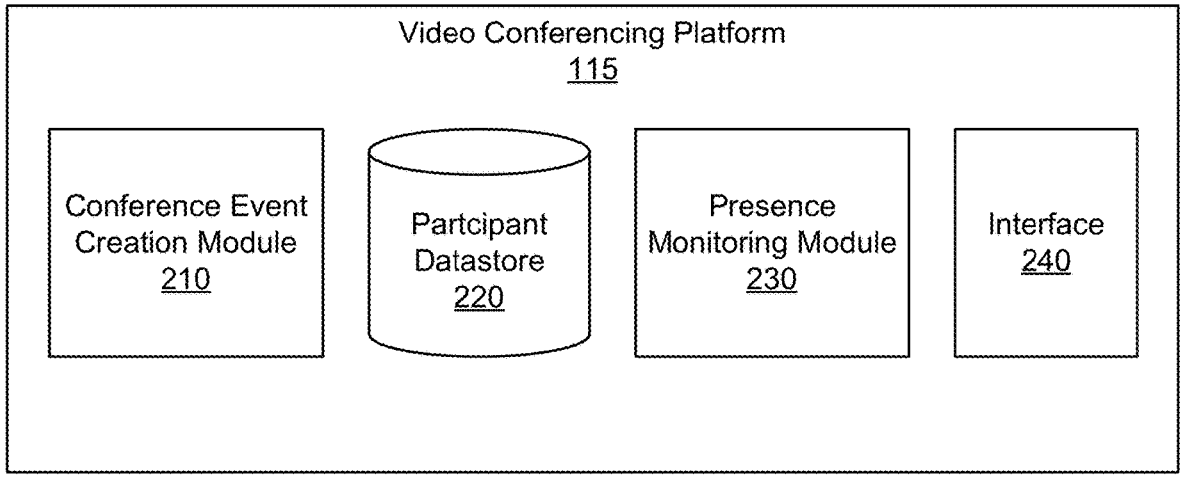
FIG. 2 is a block diagram of the video conferencing platform of FIG. 1, in accordance with some embodiments.

FIG. 2 is a block diagram of video conferencing platform 115 operating in system environment 100 of FIG. 1, in accordance with some embodiments. Video conferencing platform 115 includes software modules such as conference event creation module 210 and presence monitoring module 230. Video conferencing platform 115 also includes or accesses a local database such as participant datastore 220. Video conferencing platform 115 also includes interface 240, which may include hardware and/or software components, that enable video conferencing platform 115 to communicate with user devices or third-party platform servers (e.g., centralized document system 110 of FIG. 1) through a network. Video conferencing platform 115 may have alternative configurations than shown in FIG. 2, including different, fewer, or additional components. Some or all of the functionality and related hardware and/or software components may be subsumed by the centralized document system 110 of FIG. 1.

Conference event creation module 210 may create a conference event based on user operation. For example, a participant (e.g., originating entity 150 of FIG. 1) operates a conferencing client on a user device associated with the participant and creates an electronic invitation to attend a conference and sends the electronic invitation to one or more other participants (e.g., one or more receiving entities 155 of FIG. 1) via the conference event creation module 210. The electronic invitation may include logistical information (e.g., user identifiers and/or other information about participants to attend the conference, date and time information, information on how to join the conference, and the like; logistical data) for the conference event.

Interface 240 may orchestrate interactivity with one or more applications of centralized document system 110 of FIG. 1 (e.g., via handshaking signals), so that, for example, the host operating the user device to create the electronic invitation via video conferencing platform 115 may associate the electronic invitation with an envelope that is generated and managed by centralized document system 110 based on operation on the user device by the host and that is to be executed by the participants during the conference associated with the invitation.

Each participant can be associated with a username, email address, or other identifier that can be used by video conferencing platform 115 to identify the participant and to control the ability of the participant to create, manage, or attend conferences hosted by video conferencing platform 115. Information regarding participants who have utilized video conferencing platform 115 to host or attend conferences may be stored in participant datastore 220. Participant datastore 220 may also store other data associated with video conferencing platform 115 like the logistical information for upcoming conference events to be hosted by video conferencing platform 115, logistical information of past conferences hosted by video conferencing platform 115, participant-specific information indicating conferences attended by each participant, conference recordings, and the like.

Presence monitoring module 230 may be configured to detect presence information of participants to a conference hosted by video conferencing platform 115. For example, the presence monitoring module 230 determine for a given conference in real time, whether a given participant that is invited to the conference is actually present in the conference. Interface 240 may be further configured to transmit the presence information detected by presence monitoring module 230 to external systems such as centralized document system 110.

Centralized Document System

Figure 3A:
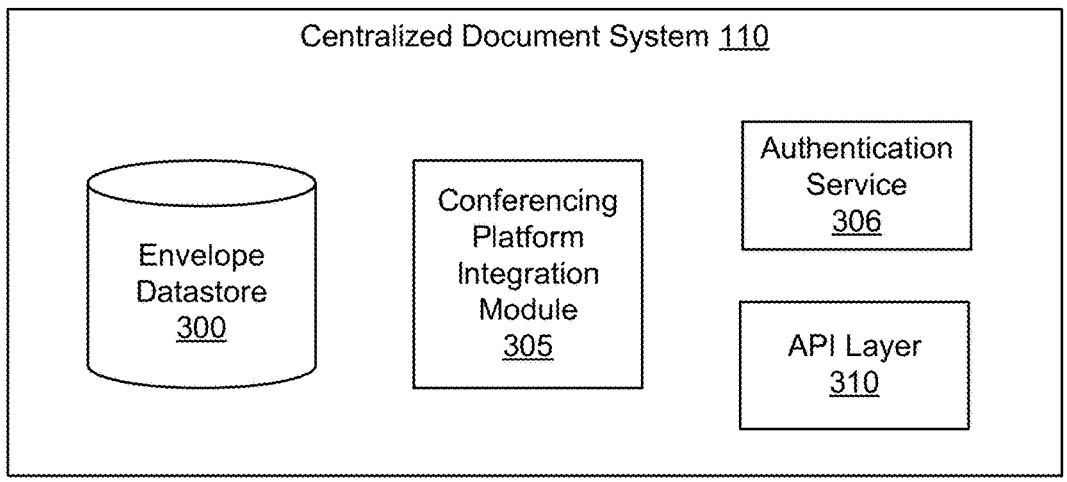
FIG. 3A is a block diagram of the centralized document system of FIG. 1, in accordance with some embodiments.
Figure 3B:
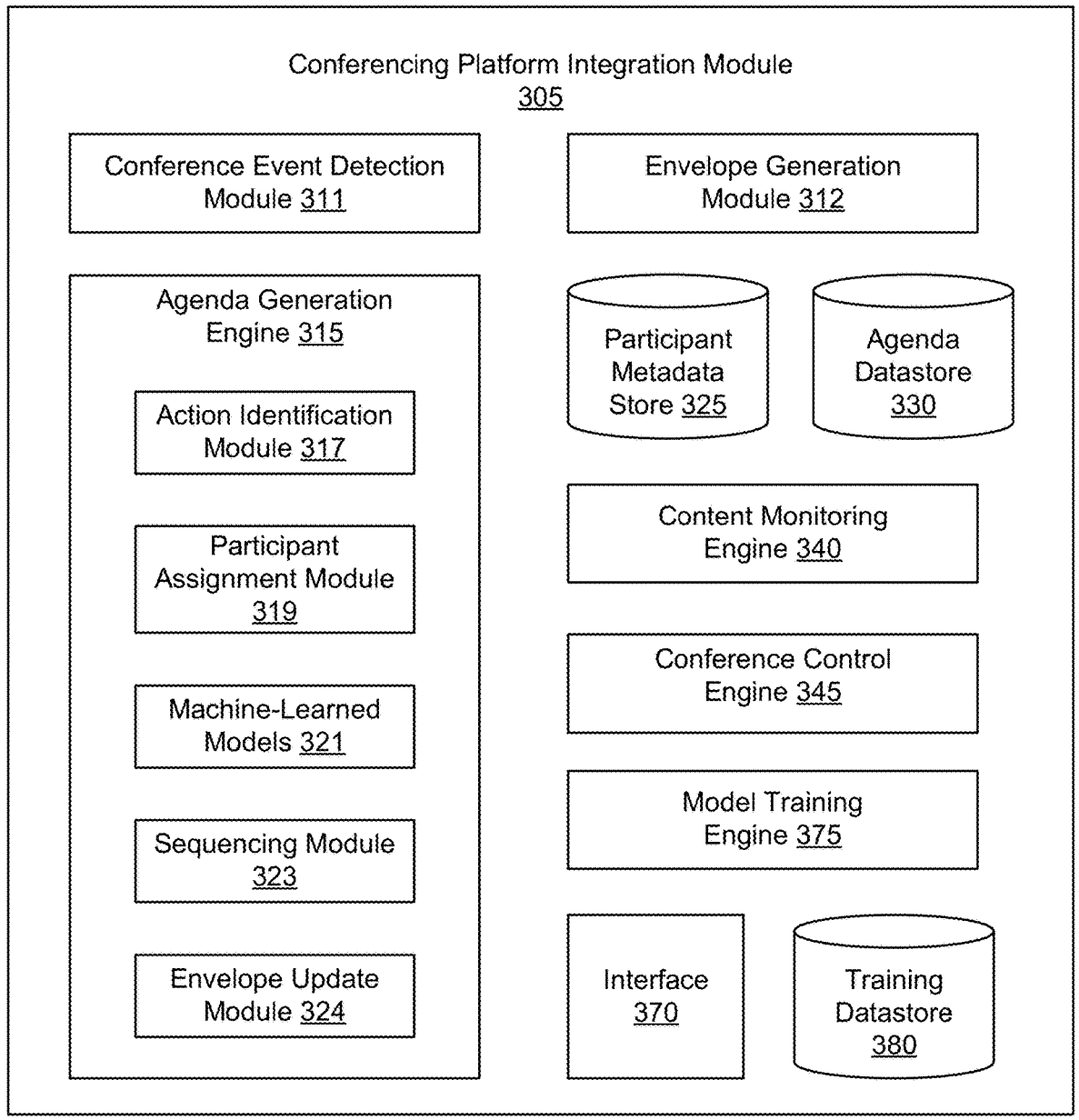
FIG. 3B depicts a block diagram of a conferencing platform integration module of the centralized document system of FIG. 3A, in accordance with some embodiments.
Figure 3C:
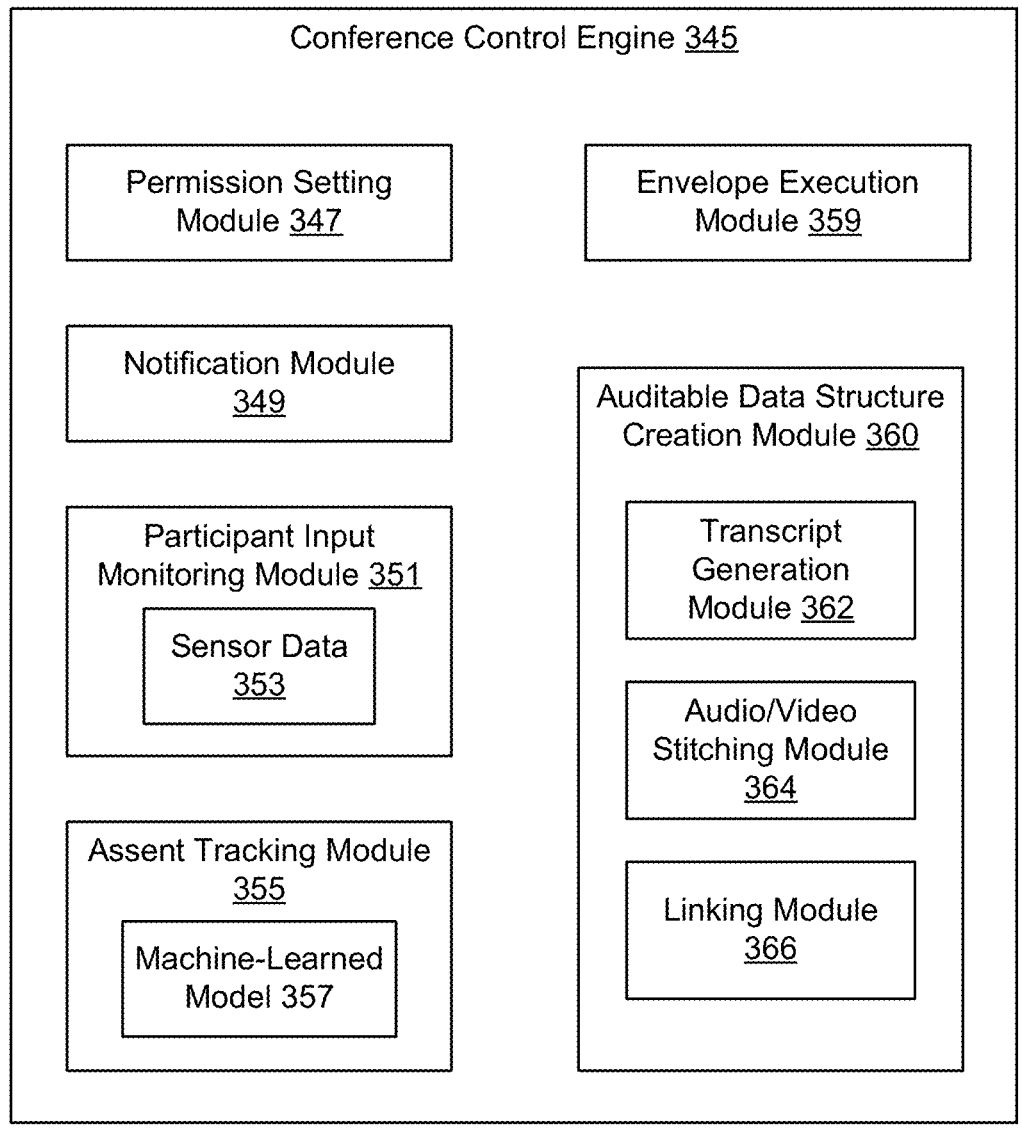
FIG. 3C shows a block diagram of a conference control engine of the conferencing platform integration module of FIG. 3B, in accordance with some embodiments.

FIG. 3A is a block diagram of centralized document system 110 of FIG. 1, in accordance with some embodiments. As shown in FIGS. 3A, centralized document system 110 includes envelope datastore 300, conferencing platform integration module 305, authentication service 306, and application programming interface (API) layer 310. FIG. 3B depicts a block diagram of conferencing platform integration module 305 of centralized document system 110, in accordance with some embodiments. FIG. 3C shows a block diagram of conference control engine 345 of FIG. 3B, in accordance with some embodiments. Centralized document system 110 may have alternative configuration than shown in FIGS. 3A-3C, including different, fewer, or additional components. Each of the components and corresponding functionality of centralized document system 110 shown in FIGS. 3A-3C is described below.

Referring to FIG. 3A, envelope datastore 300 stores envelopes managed by centralized document system 110. Envelopes can include templates of envelopes that may be modified by an envelope generation engine to generate a specific version of an envelope. The specific version can also be stored in envelope datastore 300. For example, a template for a business purchase and sale agreement can be stored in envelope datastore 300 with modifiable fields for names of executors (e.g., one or more buyers and one or more sellers) who are to electronically sign the agreement, and their contact information (e.g., address, phone number), job titles and the like. Envelopes stored in envelope datastore 200 can also include executed envelopes.

Conferencing platform integration module 305 integrates conferencing functionality provided by a video conferencing platform (e.g., platform 115 of FIG. 1) with online document execution and management functionality provided by centralized document system 110 to enable signing sessions during which an envelope may be executed online by multiple participants to the conference in real time. Conferencing platform integration module 305 provides several features related to the integrated solution for online document execution during (audio/video) conferences. Details of the functionality provided by conferencing platform integration module 305 are provided in connection with FIGS. 3B and 3C.

Authentication service 306 may establish an identity of a participant that is the recipient of an electronic signature envelope or that joins a conference enabled by conferencing platform integration module 305 as a participant. In some embodiments, authentication service 306 may include an electronic signature service (ESS) that creates and manages electronic identity/identification (EID) cards for users of centralized document system 110. For example, the ESS may perform recipient (e.g., envelope recipient, conference participant) ID verification using a Government ID, SMS text, knowledge-based authentication, trust score-based authentication, etc. Configuration of the electronic signature service (ESS) that creates and manages electronic identity/identification (EID) cards is described in more detail in U.S. Pat. No. 11,055,387, filed Sep. 28, 2019, by Thomas Gonser et al. and entitled "System and Method for Identity and Reputation Score Based on Transaction History," which is herein incorporated by reference in its entirety.

API layer 310 orchestrates interactivity (e.g., via handshaking signals) between centralized document system 110 and external applications such as one or more applications run by video conferencing platform 115 of FIG. 1, as will be described in more detail below with respect to interface 370 of FIG. 3B.

Referring now to FIG. 3B, conferencing platform integration module 305 includes conference event detection module 311, envelope generation module 312, agenda generation engine 315, participant metadata store 325, agenda datastore 330, content monitoring engine 340, conference control engine 345, interface 370, model training engine 375, and training datastore 380. Agenda generation engine 315 includes action identification module 317, participant assignment module 319, machine-learned models 321, sequencing module 323, and envelope update module 324. Conferencing platform integration module 305 may have alternative configuration than shown in FIG. 3B, including different, fewer, or additional components.

Conference event detection module 311 detects the creation of a conference event by conference event creation module 210 of video conferencing platform 115. For example, a host user (e.g., participant) may operate a conferencing client on a host user device that interacts with conference event creation module 210 of video conferencing platform 115 to create an electronic invitation to a conference and send the electronic invitation to one or more invitees (e.g., participants). Operations performed by the host user on the conferencing client may further include instructions to generate an envelope or electronic document that is to be executed by participants during the conference. The instructions from the host user on the conferencing client may cause interactivity between interface 240 of video conferencing platform 115 and interface 370 of centralized document system 110. The interactivity may result in conference event detection module 311 of centralized document system 110 detecting the electronic invitation created by the host user on the conferencing client and further detect based on data associated with the invitation, logistical information about the conference (e.g., as provided by the host user to the conferencing platform) such as the date and time when the conference is to be held, information about the envelope to be executed during the conference, information about the attendees and hosts such as names, user identifiers, locations, job titles, and the like.

Based on the logistical information, envelope generation module 312 of centralized document system 110 may generate an envelope and associate the envelope with the conference, where the envelope or electronic document is to be executed by participants during the conference. In another embodiment, a client on the host user device may interact with centralized document system 110 to cause envelope generation module 312 to generate the envelope and associate the envelope with a conference, and the centralized document system 110 may then in turn interact with video conferencing platform 115 to complete the creation of the conference event and send the invitation to the conference to the attendees. The conference event detected by conference event detection module 311 may thus be associated with an electronic signature envelope and a plurality of participants (e.g., hosts and attendees).

In some embodiments, the envelope generated by envelope generation module 312 and associated with the conference event detected by conference event detection module 311 based on the logistical information may be a template (e.g., default or non-customized) version of a particular type of online document for execution. For example, the envelope may include a particular type of contract to be signed during the conference between the participants (hosts and invitees), but without customizations, like names of the executors, their roles (e.g., buyer, seller, etc.) in the contract, or other information like job title, contact information, and the like, filled into the signature fields of the envelope. That is, the template version may not specify which participant is supposed to sign the envelope, where each participant is supposed to sign, and the like. In other embodiments, the envelope associated with the conference event detected by the conference event detection module 311 may be a more specific (e.g., customized) version of the selected type of document that is at least partially completed (e.g., by the conference host) with the relevant information (names, job titles, contact information, and the like) at portions (e.g., pages, sections) of the envelope where respective participants are to sign the envelope during the conference. The generated envelope or online document may include various information such as participant names, participant locations (e.g., an address), a date on which the envelope or document was created, or any suitable information. The generated envelope or online document may include electronic signature fields that assigned corresponding participants may interact with (e.g., using their user device) to provide centralized document system 110 with their electronic signature.

As used herein, "signing" the envelope or "electronic signature" may include any behavior by an assigned corresponding participant that is captured electronically and online during a conference that may indicate assent. For example, the assigned participant may sign in a corresponding electronic signature field (or fields) of the envelope by typing their initials or name in the signature field, scribbling on a touchscreen, clicking a button to indicate assent, nodding, raising a hand, or making another physical gesture to indicate assent, making an utterance (e.g., "yes" or "uh-huh") to indicate assent, and the like.

Agenda generation engine 315 may generate an agenda corresponding to the envelope generated by envelope generation module 312 and associated with the conference event detected by conference event detection module 311. The agenda may include a sequence of a plurality of actions, each action of the sequence having its assigned corresponding participant. As used herein, an "action" taken by a participant with respect to the envelope means the participant interacting with an electronic signature field of the envelope to provide centralized document system 110 with their electronic signature (e.g., signature, initial, etc.). The envelope may include a plurality of actions, and each action may have an assigned corresponding participant who is to perform the action. For example, if an envelope documenting the terms of an agreement between two parties is a 2-page document that is to be initialed on each page and signed at the end of the second page by each party, the envelope may be said to include a total of six actions.

Action identification module 317 determines a plurality of actions to be taken with respect to the envelope during a conference corresponding to the conference event. For example, for the envelope generated by envelope generation module 312 and associated with the conference event detected by conference event detection module 311, action identification module 317 may analyze the envelope (e.g., identify predetermined tags in the document to be executed to detect all signature fields in the document where a participant is supposed to sign) and determine actions to be taken to complete execution of the envelope based on the analysis. For each of the plurality of actions, action identification module 317 may further determine a type of the action. Continuing with the above example of the envelope being a 2-page document that is to be initialed on each page and signed at the end of the second page by each party, action identification module 317 may determine by analyzing the 2-page document that the envelope includes two sign actions and four initial actions for a total of six actions.

Participant assignment module 319 may determine, for at least one of the actions identified in the envelope by action identification module 317, a corresponding participant that is to perform the action during the conference. Continuing with the above example of the envelope including six total actions, the participant assignment module 319 may determine for one or more of the six actions, the assigned participant who is to perform the action from among the plurality of participants associated with the conference event. As explained previously, in some embodiments, the envelope may be a specific version that is at least partially completed to populate the standard template to identify the participants or other information (e.g., signatory role or rank) for at least some of the signature fields (i.e., who is meant to sign where; authorization data). In this case, participant assignment module 319 may utilize the authorization data extracted from the envelope and further utilize information regarding the plurality of participants associated with the conference event to determine the assigned participant for each action.

In another embodiment, the envelope may be a template version selected by, e.g., the host, and without any customizations to populate signatory name or other information in the envelope. For example, the signature fields may simply indicate the respective signatory roles, executive ranks, or other generic information (e.g., in a purchase and sale agreement, a signature field may be tagged as a field where the buyer signs, another signature field may be tagged as a field where the seller signs, etc.). Thus, the authorization data may simply indicate the respective signatory roles, executive ranks, or other generic information for each signature field or action associated with the envelope. In this case, participant assignment module 319 may utilize the authorization data and metadata of the participants associated with the envelope and with the corresponding conference to make the action-specific assignments.

Metadata of the participants may be stored in datastore 325. The metadata may include data associated with a plurality of participants. For example, the metadata may include metadata for each user who has a user account with centralized document system 110 and/or metadata for each user who has a user account with video conferencing platform 115.

In some embodiments, the metadata may include organizational hierarchy data that includes identity data for a plurality of executive ranks of a plurality of entities (e.g., organization, business, group, etc.). That is, the metadata may include an organizational chart for different entities whose members have user accounts with centralized document system 110 and/or video conferencing platform 115. Each organizational chart may specify the structure of entity and the relationships and relative ranks (e.g., executive ranks) of its parts and positions/jobs, and information (e.g., name, location, contact information, title, job duties; identity data) regarding personnel who hold the respective ranks in the organization or entity. An example of the organizational hierarchy data is explained further below in connection with FIG. 4.

In some embodiments, to determine a corresponding participant for a particular action, participant assignment module 319 may utilize the authorization data extracted from the envelope for the particular action, access the organizational hierarchy data for a particular entity (e.g., identified based on the logistical data) associated with the envelope, obtain identity data from the organizational hierarchy data corresponding to a given executive rank of the particular entity based on the authorization data, and determine the corresponding participant for the action based on the obtained identity data. Continuing with the above example of the envelope including the six total actions, the participant assignment module 319 may determine based on the authorization data and the logistical data that a given signature field (action) in the envelope (which may be a template version) is to be executed by a participant holding an executive rank of CFO in a particular entity. And based on the organizational hierarchy data included in the participant metadata store 325, participant assignment module 319 may obtain identity data corresponding to the participant holding the executive rank of CFO in the particular entity and determine the corresponding participant for the action based on the identity data. Module 319 may further utilize information regarding the plurality of participants associated with the conference event to determine the assigned participant based on the identity data.

In some embodiments, the authorization data associated with the action may not identify a subset of executive ranks as being authorized to complete the action. For example, the authorization data may identify a signature field as one that is to be completed by any executive of a particular entity. And in this case, participant assignment module 319 may select, based on the organizational hierarchy data of the particular entity included in the participant metadata store 325, identity data associated with a particular executive rank from among the subset of ranks to assign the participant to the action based on the logistical data for the conference event (e.g., one of the subset of identities who is invited to attend the conference event).

In some embodiments, based on the authorization data and the logistical information of the conference, participant assignment module 319 may determine a signatory role associated with a given action. For example, in case of an agreement between a buyer and a seller, participant assignment module 319 may determine for a given signature field whether it is to be signed by the buyer or by the seller and based on the determined signatory role associated with the action, participant assignment module 319 may selecting one of the plurality of participants of the conference event as the corresponding participant for the action. For example, participant assignment module 319 may access participant metadata store 325 based on the logistical data and the envelope to determine the participant role of each participant, and participant assignment module 319 may make the assignment based on a match between the participant role of a given participant and the signatory role associated with the action.

In some embodiments, participant assignment module 319 may update the assignment of a particular participant for a given action to a new participant, based on presence information of the plurality of participants during the conference as determined by presence monitoring module 230 of video conferencing platform 115. For example, it may be determined after start of the conference that a participant assigned to a given action in the agenda (based on the electronic invitation of the conference event) is not actually present in the conference. In response to this determination, in some embodiments, participant assignment module 319 may update the assignment for one or more actions of the sequence in the agenda based on the authorization data of the envelope and the metadata of the participants who are determined to be present based on the presence information. In other embodiments, participant assignment module 319 may cause transmission of a notification to a user (e.g., host participant) indicating absence of the acting participant.

Agenda generation engine 315 may include one or more machine-learned models 321 that are trained by model training engine 375 using training data stored in training datastore 380 to assign a participant to a given action. For example, machine-learned model 321 may be trained to predict the identity data based on historical signature activity data of the plurality of participants. The historical signature activity data may be stored as training data in training datastore 380. The historical signature activity data may include signature activity that is of each of a plurality of the participants based on executed envelopes stored in envelope datastore 300, and that is in the form of authorization data and identity data for respective signature fields in the executed envelopes. The training data may be used to train machine-learned models so that a feature vector generated based on the authorization data (and optionally, further based on the logistical data of the conference) for a given action can be input to the trained machine-learned model 323 to predict identity data for the given action. The participant assignment module 319 may determine the corresponding participant for the action based on the predicted identity data (e.g., matching the predicted identity data with the logistical data for the conference including data on the plurality of participants and identifying one of the participants as the assigned participant to the action).

Sequencing module 323 generates a sequence of the plurality of actions to be taken with respect to the envelope, each action of the sequence having its corresponding participant assigned by the participant assignment module 319. Sequencing module 321 may determine the sequence in which the plurality of actions are to be performed by corresponding assigned participants based on predetermined rules stored in agenda datastore 330. For example, the rules may be predetermined based on a type of the envelope associated with the conference event. The rules may dictate actions that are prerequisites for other actions among the plurality of actions associated with the envelope. Based on the rules, sequencing module 323 may determine which action is performed first, which action is second, and so on. As another example, the rules may be based on a preference (that may be learned by a machine-learned model 321) of the host participant that has sent the electronic invitation to the conference event. In some embodiments, the sequencing module 323 may generate the sequence in which a subset of the actions that can be performed in parallel. The agenda generation engine 315 generates the agenda for the conference event based on the sequence set by sequencing module 321 and stores the generated agenda in agenda datastore 330. The agenda may further also be transmitted to one or more participants of the conference event. The sequence of the plurality of actions in the generated agenda may dictate the order in which the plurality of actions are to be performed during the conference corresponding to the conference event.

In some embodiments, sequencing module 323 may further be configured to update the sequence generated and set by sequencing module 323 based on an operation by a user (e.g., host participant). For example, sequencing module 323 may generate the agenda including the sequence of the plurality of actions as a first sequence of actions based on the predetermined rules (e.g., default rules).

In response to an input from a user during the conference (or prior to the conference), sequencing module 323 may update the first sequence of actions to a second sequence of actions, the second sequence being different from the first sequence. For example, instead of a first participant performing actions (e.g., signing) on the envelope followed by a second participant as dictated by the first sequence, the second sequence may change the sequence such that the second participant performs actions (e.g., signing) on the envelope prior to the first participant. The envelope may then be executed during the conference based on the second sequence. In some embodiments, the process of updating the agenda to update the first sequence to the second sequence may be a user-controlled operation. In other embodiments, the process may be automated and controlled by a machine-learned model 321 that is trained based on historical data of action sequence updates made by a particular user indicating the particular user's preference for the sequence in which to complete actions. The machine-learned model 321 (that maybe specific to a particular user) may accept as input the first sequence of actions and predict and output the second sequence of actions. The historical data of action sequence updates made by a particular user may be stored as training data in training datastore 380, and model training engine 375 may train the user-specific model based on the training data.

Envelope update module 324 may update a portion of the envelope associated with the action based on the determined corresponding participant. That is, envelope update module 324 may update the envelope generated by envelope generation module 312 to include for each action the corresponding participant assigned by participant assignment module 319. In some embodiments, envelope update module 324 may populate the envelope (which may be a standard template) based on information regarding the corresponding participant assigned by participant assignment module 319 for each action. That is, envelope update module 324 may populate fields of a standard template for an envelope using the corresponding participant information.

By integrating the envelopes managed by centralized document system 110 with conferences managed by video conferencing platform 115, users 130 are able to conduct online signing sessions during which envelopes may be executed by multiple participants to the conference in real time. That is, based on the agenda generated by agenda generation engine 315, conferencing platform integration module 305 may control the conference to cause the plurality of actions to be performed by the assigned corresponding participants in the sequence of the actions dictated by the agenda.

The agenda may be generated by agenda generation engine 315 prior to start of the conference. When the conference starts, content monitoring engine 340 may access the agenda corresponding to the conference from agenda datastore 330 to obtain the sequence of actions that are to occur during the conference. Content monitoring engine 340 may further be configured to receive a content feed associated with the conference. For example, the content feed may include audio/video feed from user devices associated with participants to the conference, shared content being shared by a sharing participant, data entry from participants to the conference via respective user devices, and the like, received via interface 370 from video conferencing platform 115. As another example, the content feed may include content associated with the envelope that is being accessed from the cloud, that is being shared with and edited by the participants during the conference.

The sequence of actions may dictate the sequence in which the respective assigned participants interact with the shared content corresponding to the envelope to provide centralized document system 110 with their respective electronic signatures. To implement the sequence, conference control engine 345 may operate to dynamically drive control permissions during the conference. That is, conference control engine 345 may dynamically and sequentially grant (and revoke) the respective assigned participants control permissions to interact with the shared content corresponding to the envelope to provide centralized document system 110 with their respective electronic signatures. Conference control engine 345 may further control video conferencing platform 115 to update the shared content corresponding to the envelope that is displayed to the plurality of participants to automatically navigate the displayed content to the next electronic signature field (e.g., next page or appropriate section or field of page of online document) in synchronization with the dynamic grant of the control permission to the corresponding participant who assigned to interact with the content corresponding to the next electronic signature field in the envelope. Conference control engine 345 may further control to update the content corresponding to the envelope to show the electronic signature from the corresponding participant in the corresponding signature field after the acting participant has provided the electronic signature.

Content monitoring engine 340 and conference control engine 345 may perform the operations thereof via interface 370 that orchestrates interactivity of centralized document system 110 with one or more components or applications of video conferencing platform 115.

During the conference, a sharing participant (e.g., host participant) may share content corresponding to the envelope associated with the conference so that participants assigned to the respective actions of the sequence of the agenda may interact with the respective electronic signature fields in the envelope to provide their respective electronic signatures. In one embodiment, to share the content corresponding to the envelope, the sharing participant may access the envelope or online document from envelope datastore 300 on their user device used for participating in the conference and share with the other (acting) participants, a screen associated with the user device. The acting participants may then interact with the envelope by obtaining access to the user device of the host participant. Thus, the acting participants may interact with the envelope via the user device of the host or sharing participant.

In another embodiment, the envelope or online document from envelope datastore 300 may be hosted on a cloud-based sharing or collaboration service and the sharing participant may share the content corresponding to the cloud-based envelope with the acting participants to the conference by performing a predetermined action (e.g., clicking on a link when starting the conference). The other participants may then interact with the envelope by directly accessing the envelope hosted on the cloud. Thus, the acting participants may directly interact with the envelope hosted on the cloud and managed by centralized document system 110.

Referring to FIG. 3C, conference control engine 345 includes permission setting module 347, notification module 349, participant input monitoring module 351, assent tracking module 355, envelope execution module 359, and auditable data structure creation module 360. Participant input monitoring module 351 includes sensor data 353. Assent tracking module 355 includes machine-learned model 357. Auditable data structure creation module 360 includes transcript generation module 362, audio/video stitching module 364, and linking module 366.

Permission setting module 347 determines an acting participant for a given action. Permission setting module 347 may access the agenda to determine the corresponding participant assigned for the given action as the acting participant. Permission setting module 347 may grant edit permissions to the acting participant, the edit permissions conferring an ability to edit the content monitored by content monitoring engine 340. In some embodiments, permission setting module 347 may control interface 370 to transmit an API call to external conferencing platform 115 to grant the edit permissions to an identified acting participant. The instructions granting the edit permissions may be limited such that the user device of the acting participant may only perform a predetermined action (e.g., click a button, input text in a specific field, etc.) with respect to the envelope. That is, the edit permissions may not confer the acting participant to make any changes to the content of the envelope or modify signature fields other than the signature filed corresponding to the current given action. In some embodiments, the edit permission may allow the acting participant to operate their user device to interact with a signature field corresponding to the given action of the envelope via a shared screen of the user device of the sharing participant. In other embodiments, the edit permission may allow the acting participant to operate their user device to directly interact with the signature field corresponding to the given action of the envelope that is shared via the cloud.

Permission setting module 347 may further be configured to remove (revoke) edit permissions from the acting participant, after determining that an entry of data corresponding to the given action has been received from the user device of the acting participant. In some embodiments, permission setting module 347 may control interface 370 to transmit an API call to external conferencing platform 115 to remove the edit permissions from an identified acting participant.

Notification module 349 may be configured to transmit notifications to one or more participants of the conference. For example, notification module 349 may transmit an edit permission granted notification to a user device of an acting participant for a given action to notify the participant to enter data corresponding to the given action (e.g., interact with the signature field to provide electronic signature). As another example, notification module 349 may transmit an edit permission removed notification to the user device of the acting participant after the requested input has been received to notify the participant that they no longer have the edit permission to edit the envelope during the conference.

Participant input monitoring module 351 utilizes the content feed received by the content monitoring engine 340 during the conference to monitor input of data from the acting participant corresponding to the current action into the content shared by the sharing participant. That is, participant input monitoring module 351 may determine whether the acting participant to whom the edit permission has been granted by permission setting module 347 and who is assigned to the given action has input data (e.g., sensor data like audio or video data, data entry via a peripheral device like keyboard, mouse, touch screen, etc.) that corresponds to the given action.

In some embodiments, the data entry may comprise the acting participant interacting with the shared content corresponding to the given action of the envelope using a peripheral device (e.g., inputting text, clicking a button on a GUI, scribbling on a touch screen, etc.). In other embodiments, the data entry may comprise the acting participant interacting with the shared content corresponding to the given action of the envelope using gestures or verbal cues. The gestures (e.g., the acting participant nodding in response to the given action being displayed on the screen and the host participant verbally asking the acting participant over the conference if the agree) or verbal cues (e.g., the acting participant saying "I agree") may be captured as sensor data 353 using sensors (e.g., microphone, camera) of the acting participant user device.

Participant input monitoring module 351 may be configured to start and stop the input monitoring of the data from the acting participant based on the edit permission granted and removed by permission setting module 347. Thus, to protect user privacy, after the edit permission from the participant has been removed, tracking or generation of sensor data (e.g., audio data, video data) from the user device of the acting participant is stopped.

Assent tracking module 355 may be configured to determine whether the data whose input is monitored by participant input monitoring module 351 indicates assent of the acting participant with respect to the shared content corresponding to the given action of the envelope. For example, in case of the data entry monitored by participant input monitoring module 351 comprises the acting participant interacting with the shared content corresponding to the given action of the envelope using a peripheral device (e.g., inputting text, clicking a button on a GUI, scribbling on a touch screen, etc.), assent tracking module 355 may determine the data entry as indicating assent, and identifies the data entry as the acting participant providing centralized document system 110 with their electronic signature with respect to the corresponding action. As another example, in case of the data entry monitored by participant input monitoring module 351 comprises the acting participant interacting with the shared content corresponding to the given action of the envelope using gestures or verbal cues, assent tracking module 355 may analyze the corresponding audio, image, and/or video feed captured by the sensors (e.g., microphone, camera, etc.) of the acting participant user device to determine if the gesture or verbal cue indicates assent.

That is, assent tracking module 355 may analyze the audio/video data to determine if the data indicates that the acting participant has performed the given action. Assent tracking module 355 may receive as input the data obtained from the sensors of the client device into an assent tracking model. The assent tracking model may be configured to classify the input data as indicating assent or dissent of the acting participant. And based on the assent tracking model classifying the input data as indicating assent, the assent tracking module 355 may determine that the data indicates that the acting participant has performed the given action.

In some embodiments, the assent tracking model includes at least one of a speech-to-text model, a natural language processing model, or a natural language understanding model. In other embodiments, the assent tracking model may be a machine-learned model 357 that is trained to classify the input data as indicating assent or dissent of the acting participant based on training data stored in training datastore 380. The training data may audio data, image data, or video data and may include labeled training assent data and labeled training dissent data.

The training data may be used to train machine-learned model 357 so that a feature vector generated based on sensor data 353 (e.g., audio data, image data, video data) for a given action can be input to the trained machine-learned model 357 to classify the input data as indicating assent of the acting participant in response to determining that a predicted probability of the input data indicating assent is greater than a first threshold.

Machine-learned model 357 outputs a likelihood that the input data indicates assent, and assent tracking module 355 determines a threshold for the likelihood (e.g., greater than 80% likelihood maps to assent). Assent tracking module 355 may further include a model trained to determine whether a confidence level of the likelihood being correct is higher than a second threshold (e.g., confidence level of greater than 51% that the likelihood determined by machine-learned model 357 is correct). Assent tracking module 355 may classify the input data as indicating assent of the acting participant in response to determining that a predicted probability of the input data indicating assent is greater than the first threshold and further determining that a confidence level of the predicted probability being correct is higher than the second threshold.

Machine-learned model 357 may include multiple models trained to perform different tasks. For example, one model may be trained as described above to classify the input data as indicating assent of the acting participant based on corresponding one or more thresholds for probability and confidence level in the probability. As another example, another model trained (using corresponding training data) in a similar manner classify the input data as indicating dissent of the acting participant based on corresponding one or more thresholds for probability and confidence level in the probability. Further, the probability and confidence level thresholds may be based on a type of the given action and a type of the electronic signature envelope. For example, when the given action is an initialing action where the acting participant is to initial on a particular page of the envelope or online document, the probability threshold for assent may be lower compared to when the given action is a signature action where the acting participant is to indicate acceptance of the terms of the agreement corresponding to the envelope by providing an electronic signature in a corresponding signature field at the end (e.g., last page) of the agreement.

Envelope execution module 359 may control operation of permission setting module 347, notification module 349, participant input monitoring module 351, and assent tracking module 355 to drive the control permissions sequentially and dynamically for the plurality of participants of the conference based on the sequence of actions dictated by the agenda, based on the content feed monitored by content monitoring module 340, and based on the detection of input data corresponding to a given action from a corresponding assigned participant.

That is, envelope execution module 359 may enable automation of a whole envelope execution process after the sharing participant has shared the envelope during the conference and started the process. In other words, envelope execution module 359 may be configured to execute the signing session during the conference in an 'auto play' mode such that once the envelope is 'launched' by the sharing participant, envelope execution module 359 automatically controls control permission setting module 347, notification module 349, participant input monitoring module 351, and assent tracking module 355, to grant the edit permissions to a first acting participant assigned to a first action of the sequence of the agenda to enter data corresponding to the first action, notify the first acting participant of the edit permissions to perform the first action, monitor input of data from the user device of the first acting participant, determine that the first acting participant has entered data corresponding to the first action indicating assent or dissent, remove the edit permissions from the first acting participant, notify the first acting participant that the edit permissions have been removed, grant edit permissions to a second acting participant assigned to a second action of the sequence to enter data corresponding to the second action, notify the second acting participant of the edit permissions to perform the second action, monitor input of data from the user device of the second acting participant, determine that the second acting participant has entered data corresponding to the second action indicating assent or dissent, remove the edit permissions from the second acting participant, notify the second acting participant that the edit permissions have been removed, and so on. Thus, envelope execution module 359 automatically modifies the content shared by the sharing participant of the conference to include content corresponding to a next action of the sequence of actions. For example, envelope execution module 359 may control interface 370 to transmit an API call to external conferencing platform 115 to automatically modifies the shared content.

As a result, in some embodiments, once the sharing participant to the conference starts the envelope execution process, transfer of control permissions to interact with the envelope may seamlessly pass from one acting participant to the next in the order dictated based on the sequence of actions and the corresponding assigned participant for each action, and envelope execution process may seamlessly be completed without any further input required from the sharing participant or host.

Auditable data structure creation module 360 generates an auditable data structure reflective of the data indicating that the acting participant has performed the given action. Auditable data structure creation module 360 includes transcript generation module 362, audio/video stitching module 364, and linking module 366.

Transcript generation module 362 may generate transcripts based on sensor data 353 monitored by participant input monitoring module 351. For example, transcript generation module 362 may generate a transcript snippet for each of the plurality of actions based on sensor data 353 from the user device of the acting participant for the action and further based on sensor data from the user device of the sharing participant or host who is sharing content corresponding to the envelope. The transcript snippet for each action may further include transcription based on content feeds associated with one or more other participants to the conference other than the acting participant and the sharing participant. Transcript generation module 362 may use transcription software, which relies on speech recognition, to automatically generate a transcript of the audio/video data of the conference. The (action-specific) transcript includes text representative of speech by at least the acting participant, and the sharing participant to the conference. In some embodiments, transcript generation module 362 adjusts the transcript based on user input. The transcripts generated by transcript generation module 362 may be stored.

Audio/video stitching module 364 facilitates the integration of audio/video snippets with the envelope managed by document management system 110. For example, audio/video stitching module 364 may generate audio/video snippets for each of the plurality of actions based on sensor data 353 from the user device of the acting participant for the action and further based on sensor data from the user device of the sharing participant or host who is sharing content corresponding to the envelope. The audio/video snippet for each action may further include audio/video data associated with one or more other participants to the conference other than the acting participant and the sharing participant for a given action. Each audio/video snippet may include the signing entity (acting participant) being instructed to electronically sign the document (e.g., by sharing or host participant), and the signing entity electronically signing the signature field associated with the current action. Audio/video stitching module 364 may combine for each action, a subset or all of these portions of the conference.

Audio/video stitching module 364 may ensure that the audio/video snippets are of sufficient quality to ensure proper audit procedures enforced by generating the auditable data structure. Audio/video stitching module 364 may determine audio/video quality metrics (e.g., audio/video bandwidth and/or resolution). If the quality metrics are below a threshold criteria, indicating that the audio/video was not clearly audible/visible, for example, audio/video stitching module 364 may prevent the generation of the corresponding snippet and transmit a notification to the acting participant and/or sharing participant to this effect. And in this case, audio/video stitching module 364 may further cause envelope execution module 359 to control operation of permission setting module 347, notification module 349, participant input monitoring module 351, and assent tracking module 355 to instruct the acting participant to perform the given action again and re-monitor data obtained from sensors of the client device of the acting participant to generate the auditable data structure. The threshold criteria for the auditable data structure (e.g., a minimum audio/video bandwidth and/or resolution) may be input manually by one or more users, may vary by jurisdiction, and/or may be set by the document management system 110 based on, e.g., envelope type.

Linking module 366 may link the audio/video snippets with respective actions of the sequence of the agenda corresponding to the envelope executed by the plurality of participants. In some embodiments, linking module 366 may further link the transcript snippets with the respective actions of the sequence in the envelope. For example, linking module 366 may embed a link to the audio/video snippet and/or the transcript snippet a section of the envelope corresponding to the action associated with the snippet.

By generating the auditable data structure for respective actions by corresponding assigned participants, only those portions of the conference feed that are relevant to the execution of the online document envelope may be stored, thereby preventing wastage of digital storage resources and network bandwidth, while also allowing users to easily navigate to relevant portions of the conference quickly.

Referring to FIG. 3B, model training engine 375 trains machine-learned models of centralized document system 110. Model training engine 375 accesses data for training the models in training datastore 380. Training data can include context information associated with centralized document system 110. The context information can include authorization data extracted from executed envelopes or template envelopes, the authorization data indicating the respective signatory roles, executive ranks, or other generic information for each signature field or action associated with the envelope. The context information can further include participant metadata, historical signature activity data of the participants, participant preference data indicating participant-specific preferences for the sequence in which to perform the plurality of actions associated with the envelope, conference data (e.g., video, audio, and image data of the conference), logistical information about the conference (e.g., the date on which the conference is held, information about the attendees and hosts such as names, user identifiers, locations, job titles, etc.).

Model training engine 375 may submit data for storage in training datastore 380. Model training engine 375 may receive labeled training data from a user or automatically label training data (e.g., using computer vision). Model training engine 375 uses the labeled training data to train a machine-learned model. In some embodiments, model training engine 375 uses training data labeled with indications that an acting participant is indicating assent to an action, and labeled with indications that an acting participant is indicating dissent to an action. Model training engine 375 uses training data labeled with indications of participants who generally execute envelopes of certain types and in certain capacities (e.g., executive ranks or roles) on behalf of corresponding entities or organizations. Model training engine 375 uses training data labeled with indications of a preferred order or sequence of actions of a particular sharing participant or organization when executing an envelope.

In some embodiments, model training engine 375 uses user feedback to re-train machine-learned models. Model training engine 375 may curate what training data to use to re-train a machine-learned model based on a measure of satisfaction provided in the user feedback. For example, model training engine 375 receives user feedback indicating that a user is highly satisfied with participant assignments to respective actions identified for an envelope. Model training engine 375 may then strengthen an association between context information and a model output (e.g., identity data etc.) by creating training data using the context information and machine-learned model outputs associated with the high satisfaction to re-train one or more of the machine-learned models. In some embodiments, model training engine 375 attributes weights to training data sets or feature vectors. Model training engine 375 may modify the weights based on received user feedback and re-train the machine-learned models with the modified weights. By training a machine-learned model in a first stage using training data before receiving feedback and a second stage using training data as curated according to feedback, model training engine 375 may train machine-learned models of centralized document system 110 in multiple stages.

Interface 370 is an interface for a user and/or a third-party software platform (e.g., video conferencing platform 115) to interact with centralized document system 110. Interface 370 may be a web application that is run by a web browser at a user device or a software as a service platform that is accessible by the client device through network 120. Interface 370 may be the front-end component of a mobile application or a desktop application. In one embodiment, interface 370 may use application program interfaces (APIs) to communicate with user devices or third-party platform servers, which may include mechanisms such as webhooks.

Agenda Generation

Figure 4:
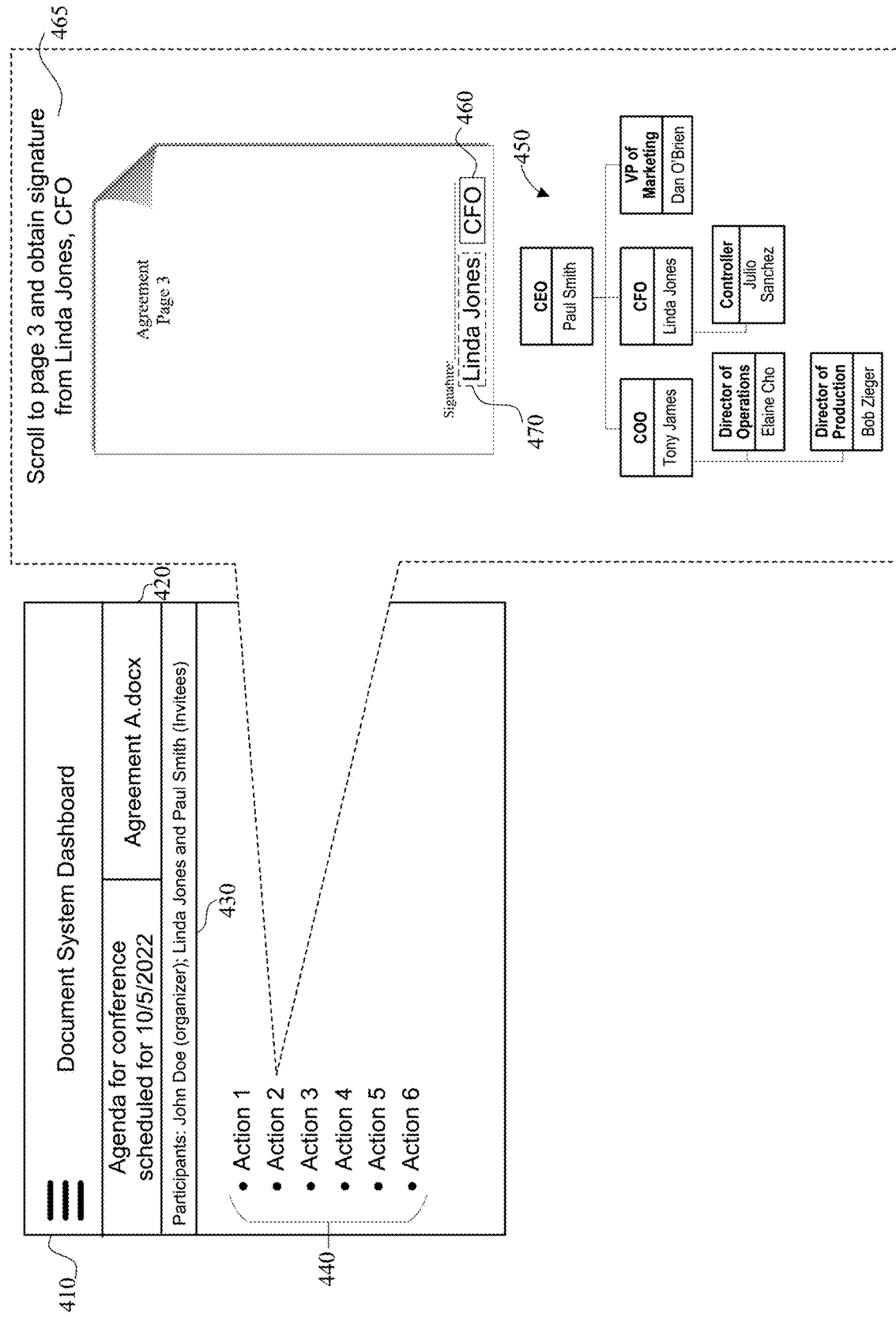
FIG. 4 depicts a process of generating an agenda including a plurality of actions to be taken during a conference, in accordance with some embodiments.

FIG. 4 depicts example 400 of a process of determining a participant for an action based on participant metadata, in accordance with some embodiments. FIG. 4 shows document system dashboard 410 of centralized document system 110. A user (organizer) may schedule a conference event using a conferencing client on their user device and via video conferencing platform 115. When scheduling the conference event, the user may identify envelope 420 managed by centralized document system 110 as being associated with the scheduled conference event, and further transmit an electronic invitation to the conference event to a plurality of participants 430. In example 400 shown in FIG. 4, the envelope may be an agreement (Agreement A.docx) that is to be executed by the plurality of participants 430 identified by the user. Envelope 420 may be a standard template whose signature fields do not identify the name of the party that is to interact with the online document to provide their electronic signature to centralized document system 110.

Centralized document system 110 may analyze envelope 420 (e.g., identify predetermined tags in the agreement to detect all signature fields where a participant is supposed to sign) and determine actions 440 to be taken to complete execution of envelope 420. In example 400, centralized document system 110 has determined six actions (Action 1-Action 6) that are to be taken to complete execution of envelope 420. For each determined action, centralized document system 110 may determine a corresponding participant that is to perform the action during the conference based on participant metadata 450. In example 400, centralized document system 110 may obtain participant metadata 450 based on information regarding the participants 430 the electronic invitation to the conference event was sent to by the host user. That is, based on identifying information (e.g., name, company name, email address, email domain, etc.) of the participants 430 included by the host user in the invitation to the conference event, centralized document system 110 may access participant metadata 450 (e.g., an organizational chart of the company identified in the electronic invitation) showing the names and executive ranks.

Further, based on the selected envelope 420, centralized document system 110 may obtain authorization data associated with each identified action to be completed for executing envelope 420. For example, authorization data 460 for "Action 2" of envelope 420 may be determined to be a signature field on page 3 of the agreement that is to be signed by the "CFO." Based on the authorization data 460, and further based on information regarding the participants 430 the electronic invitation to the conference event was sent and participant metadata 450, centralized document system 110 may determine that "Linda Jones" is the corresponding participant that is to perform the "Action 2" during the conference. Centralized document system 110 may update the agenda based on the assignment. For example, centralized document system 110 may update the agenda to include contextual information for each action based on the assigned corresponding participant and corresponding authorization data. Further, centralized document system 110 may update the envelope based on the assigned participant for the action. For example, as shown in FIG. 4, centralized document system 110 may populate the envelope 420 based on information regarding the corresponding participant ("Linda Jones" 470) assigned for Action 2. Centralized document system 110 may repeat steps similar to the above for assigning the corresponding participant for each of the actions.

Grant and Removal of Edit Permissions

FIGS. 5A-5D depict example 500 of controlling edit permissions to envelope 515 during a conference, in accordance with some embodiments. Centralized document system 110 may control execution of plurality of actions in the sequence dictated by the agenda during the conference. In example 500, the sequence of actions includes action 510A ("Linda Jones scroll to end of p. 3 and sign") followed by action 510B ("Paul Smith scroll to end of p. 4 and sign").

Figure 5B:
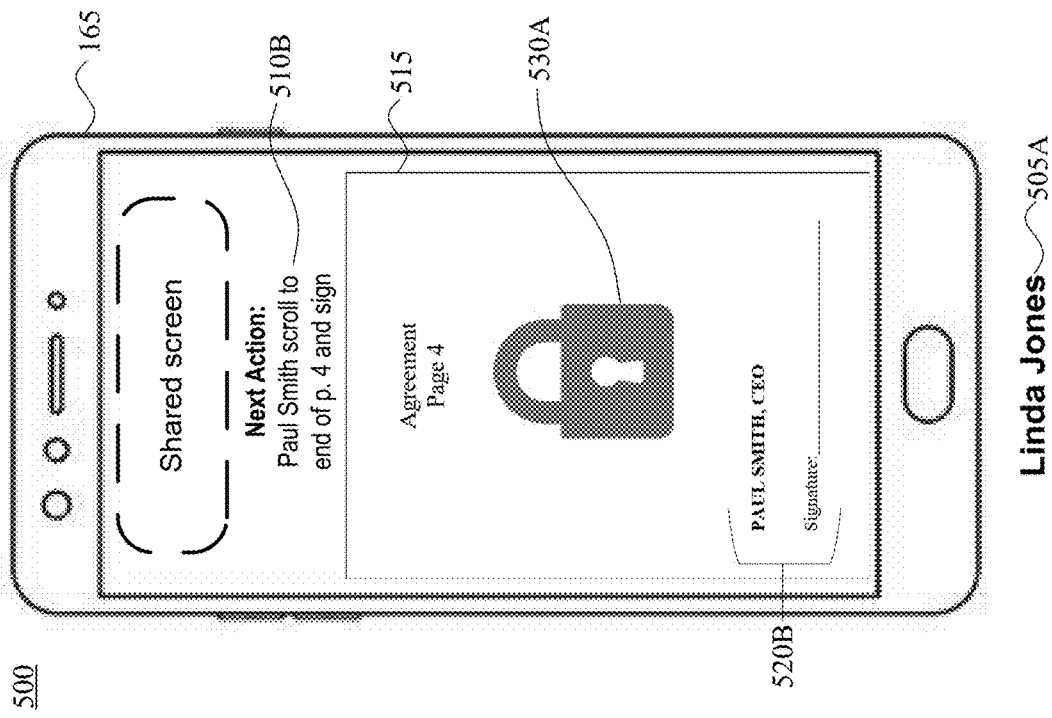
FIGS. 5A-5D depict an example of controlling edit permissions to an online document for participants to a conference, in accordance with some embodiments.

Content corresponding to envelope 515 may be shared by the sharing participant on user devices 165 of the plurality of participants (e.g., participant 505A (Linda Jones), participant 505B (Paul Smith)) during the conference. Further, centralized document system 110 may grant edit permissions to edit envelope 515 based on the sequence of actions 510 to the corresponding assigned participants. In example 500, FIGS. 5A and 5B show user device 165 of participant 505A (Linda Jones) during execution of actions 510A and 510B, respectively, and FIGS. 5C and 5D show user device 165 of participant 505B (Paul Smith) during execution of the actions 510A and 510B, respectively.

Figure 5A:
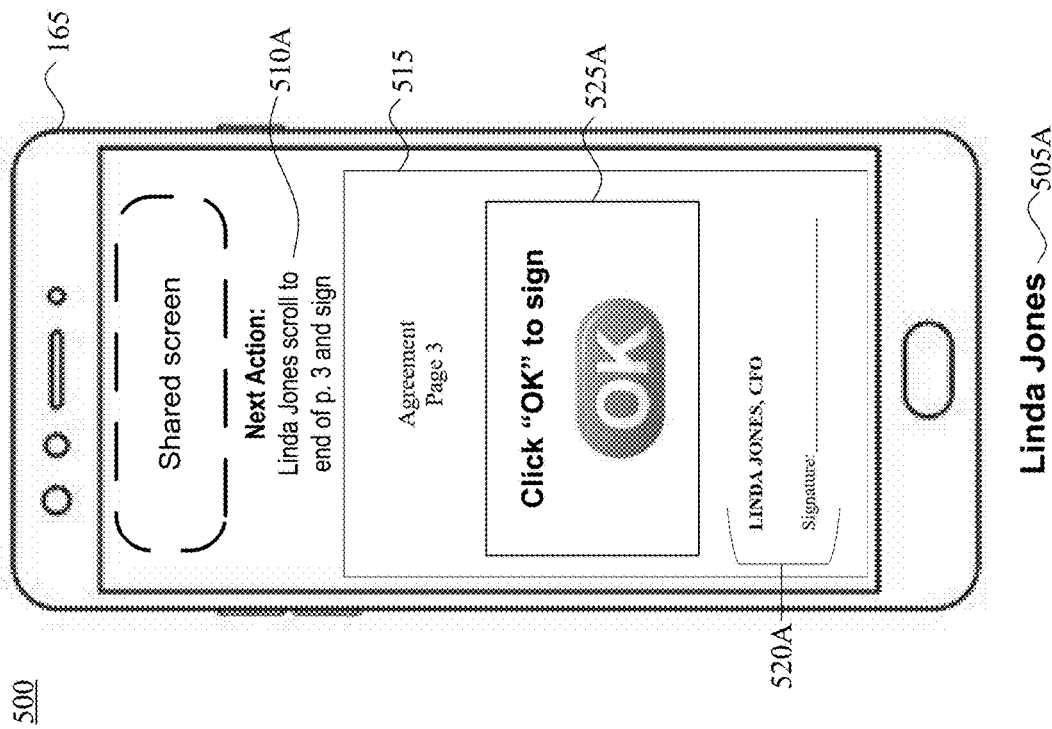
Figure 5C:
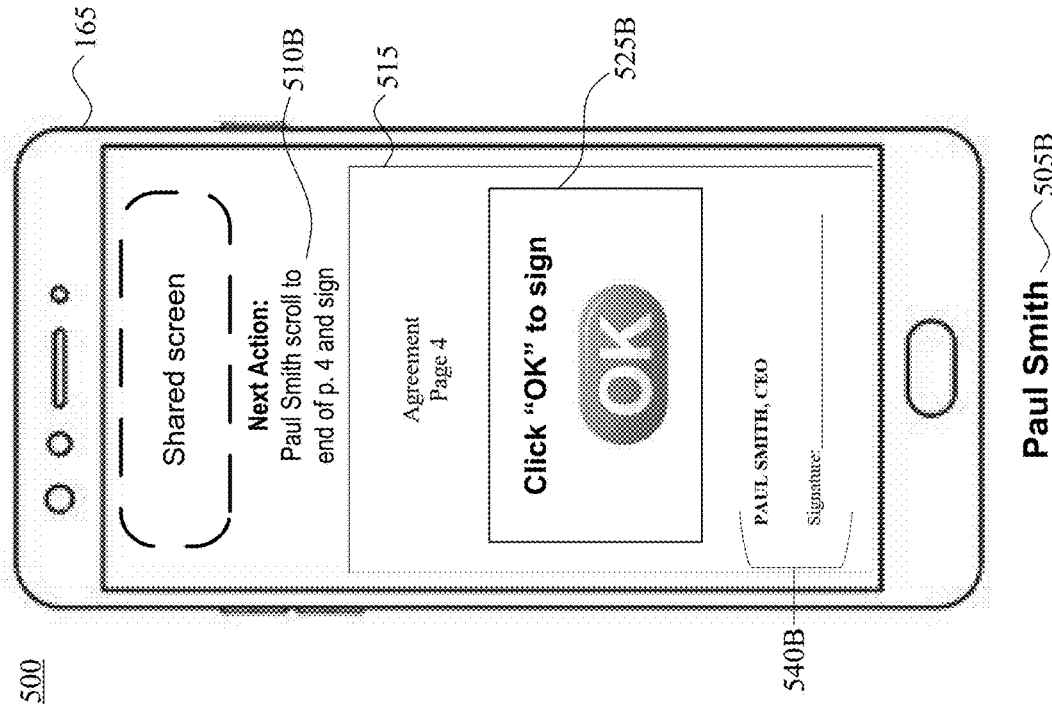
Figure 5D:
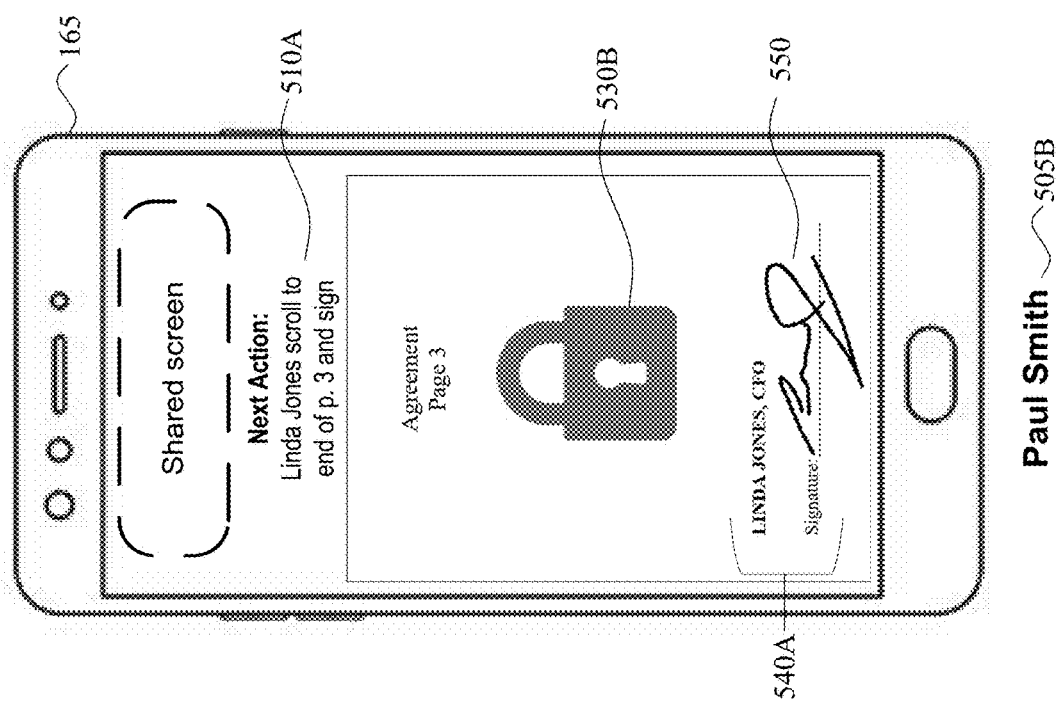

During the conference, in FIG. 5A, centralized document system 110 may grant the edit permissions to participant 505A ("Linda Jones") who is assigned to action 510A ("Linda Jones scroll to end of p. 3 and sign") to allow participant 505A to enter data corresponding to action 510A in their user device 165. The edit permissions to participant 505A in FIG. 5A may be limited to participant 505A being able to interact with signature field 520A of envelope 515 to provide their electronic signature to centralized document system (predetermined edit operation). Centralized document system 110 may determine whether the entry of data by the acting participant complies with the predetermined edit operation (e.g., clicking GUI button 525a). Responsive to determining that the entry of data complies with the predetermined edit operation, centralized document system 110 may accept the entry of data in connection with the given action 510A. Responsive to determining that the entry of data does not comply with the predetermined edit operation, centralized document system 110 may refuse the entry of data in connection with the given action 510A. And in this case, centralized document system 110 may further perform a predetermined operation like transmitting a notification to the user device 165 of acting participant 505A to re-input data in connection with the given action 510A.

In example 500, the edit permission is in the form of a GUI button ("Click OK to sign") 525A, and by clicking button 525A, Linda Jones can provide their electronic signature in signature field 520A. GUI button 525A may thus be a mechanism conferring the acting participant 505A the ability to enter data into the content shared by the sharing participant of the conference. After granting the edit permissions, centralized document system may monitor user device 165 of participant 505A for the data entry corresponding to action 510A (i.e., whether Linda Jones clicked on GUI button 525A) indicating assent. And in response to determining that data indicating assent corresponding to action 510A was entered by participant 505A, centralized document system 110 may remove the edit permissions to participant 505A to edit envelope 515, and as shown in FIG. 5B, centralized document system 110 may automatically modify content shared by the sharing participant and displayed on user device 165 of participant 505A to include content corresponding to next action 510B of the sequence of actions corresponding to envelope 515.

Further, since edit permissions to participant 505A have been removed, in FIG. 5B, centralized document system 110 may display an indication 530A on user device 165 of participant 505A signaling participant 505A that they are unable to interact with the content of envelope 515 displayed on the screen of their user device 165. In some embodiments, participant 505A may be able to view (but unable to interact or edit) content corresponding to next action 510B of envelope 515 in FIG. 5B. In other embodiments, content corresponding to next action 510B may be blocked from view of participant 505A in FIG. 5B.

FIGS. 5C and 5D show user device 165 of participant 505B (Paul Smith) during execution of the actions 510A and 510B, respectively. In FIG. 5C, since participant 505B does not have edit permissions to perform action 510A, centralized document system 110 may display an indication 530B on user device 165 of participant 505B signaling participant 505B that they are unable to interact with the content of envelope 515 displayed on the screen of their user device 165. Further, since action 510A is a previous action in the sequence of actions that has already been completed by participant 505A, signature field 540A of envelope 515 may display electronic signature 550 of participant 505A on user device 165 of participant 505B.

Further, as shown in FIG. 5D, centralized document system 110 may automatically modify content shared by the sharing participant and displayed on user device 165 of participant 505B to include content corresponding to next action 510B of the sequence of actions corresponding to envelope 515, after action 510A in FIG. 5C has been completed. Since action 510B ("Paul Smith scroll to end of p. 4 and sign") is assigned to participant 505B ("Paul Smith"), centralized document system 110 may grant the edit permissions to participant 505B to allow participant 505B to enter data corresponding to action 510B in their user device 165. The edit permissions to participant 505B in FIG. 5B may also be limited to participant 505B being able to interact with signature field 540B of envelope 515 to provide their electronic signature to centralized document system. In example 500, the edit permission is in the form of a GUI button ("Click OK to sign") 525B, and by clicking button 525B, John Smith can provide their electronic signature in signature field 540B. As shown in example 500 of FIGS. 5A-5D, once the sharing participant to the conference starts the envelope execution process, transfer of control permissions to interact with the envelope may seamlessly pass from one acting participant to the next in the order dictated based on the sequence of actions and the corresponding assigned participant for each action, and envelope execution process may seamlessly be completed without any further input required from the sharing participant or host.

Auditable Data Structure Navigation

Figure 6:
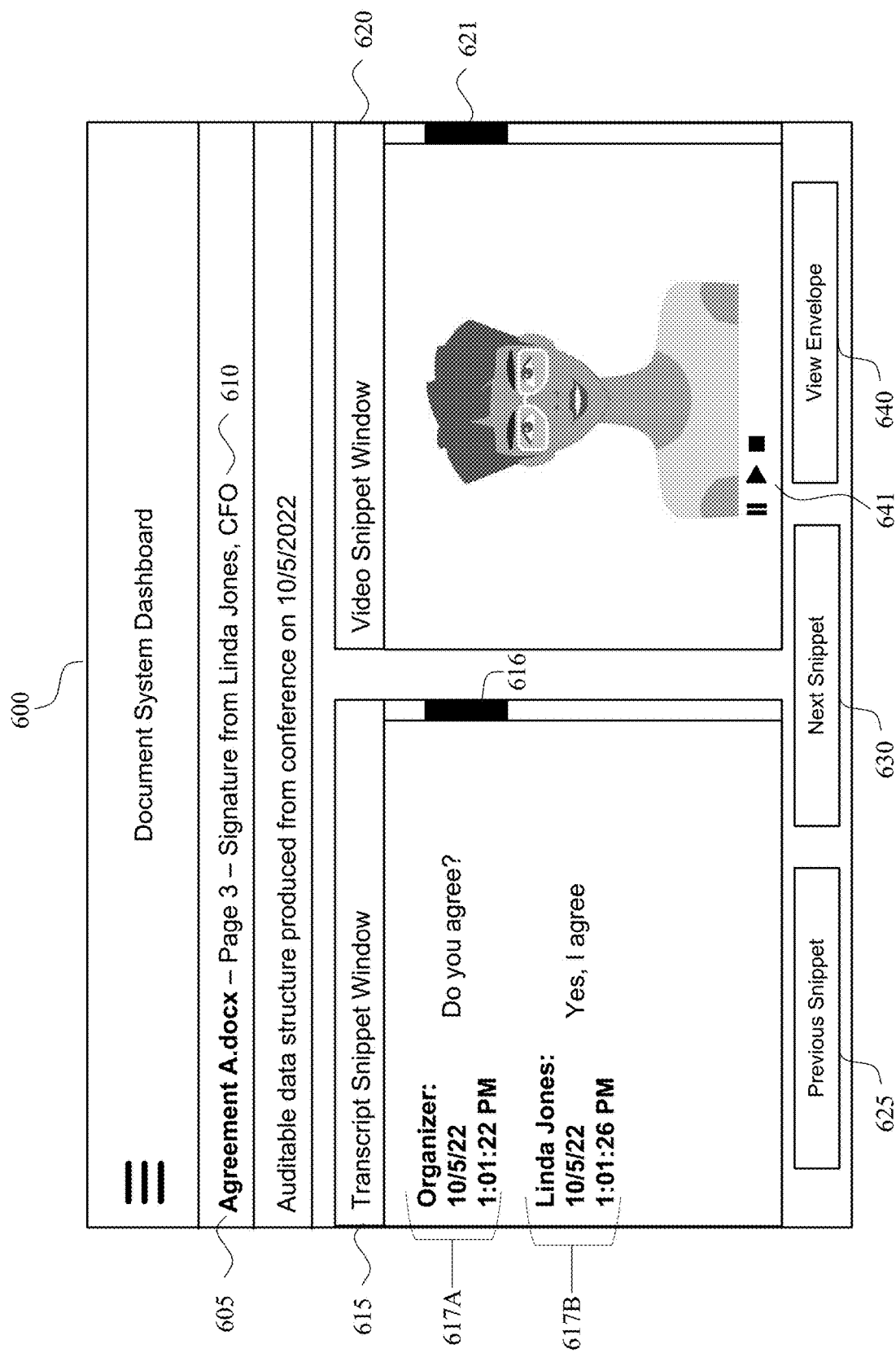
FIG. 6 depicts an example of creating an auditable data structure for a participant performing a given action, in accordance with some embodiments.

FIG. 6 depicts an example of accessing an auditable data structure associated with an acting participant of a given action of the envelope, in accordance with some embodiments. FIG. 6 shows document system dashboard 600 of centralized document system 110 that may be utilized by a user (e.g., organizer of the conference) to navigate audio/video snippets (and corresponding generated transcript snippets) associated with acting participants corresponding to the different actions of the sequence of the envelope, after the execution of the envelope (or at least one action of the envelope) has been completed.

In the example of FIG. 6, document system dashboard 600 is showing (e.g., on a user device of a host or organizing participant) auditable data structures (e.g., transcript snippets, video snippets) corresponding to executed envelope 605 ("Agreement A.docx"), and the user is currently viewing the auditable data structure corresponding to action 610 ("Page 3—Signature from Linda Jones, CFO") of the sequence of actions performed by participants to generate executed envelope 605.

As shown in FIG. 6, document system dashboard 600 may include transcript snippet window 615 to display the transcript snippet that is generated by transcript generation module 362 of FIG. 3C and that corresponds to executed action 610 of envelope 605. The transcript snippet may include the transcript of the exchange (617A, 617B) between one or more participants of the conference (e.g., between organizer participant and acting participant) during the time when the edit permission was granted to the user device associated with the acting participant corresponding to action 610. The transcript snippet 617 may also include date and time information.

Document system dashboard 600 may further include video snippet window 620 to display the audio/video snippet that is generated by audio/video stitching module 364 of FIG. 3C and that corresponds to executed action 610 of envelope 605. The audio/video snippet may include sensor data (e.g., audio/image/video data) of the exchange between one or more participants of the conference (e.g., between organizer participant and acting participant) during the time when the edit permission was granted to the user device associated with the acting participant corresponding to action 610.

Transcript snippet window 615 and video snippet window 620 may have scroll bars 616, 621 to allow the user to navigate between different snippets corresponding to different sequential actions associated with envelope 605. The user may also navigate between the snippets by operating GUI buttons 625 and 630. The user may also view the section (e.g., page) of the executed envelope that corresponds to the current snippet displayed in windows 615 and 620, by operating GUI button 640. GUI buttons 641 may be operated by a user to play, pause, or stop playback of the audio/video snippet on a user's device. Although not shown in FIG. 6, the transcript snippet may be annotated with the corresponding audio/video snippet so that clicking on the link may cause playback of the corresponding audio/video snippet.

Example Processes Using Centralized Document System

Figure 7:
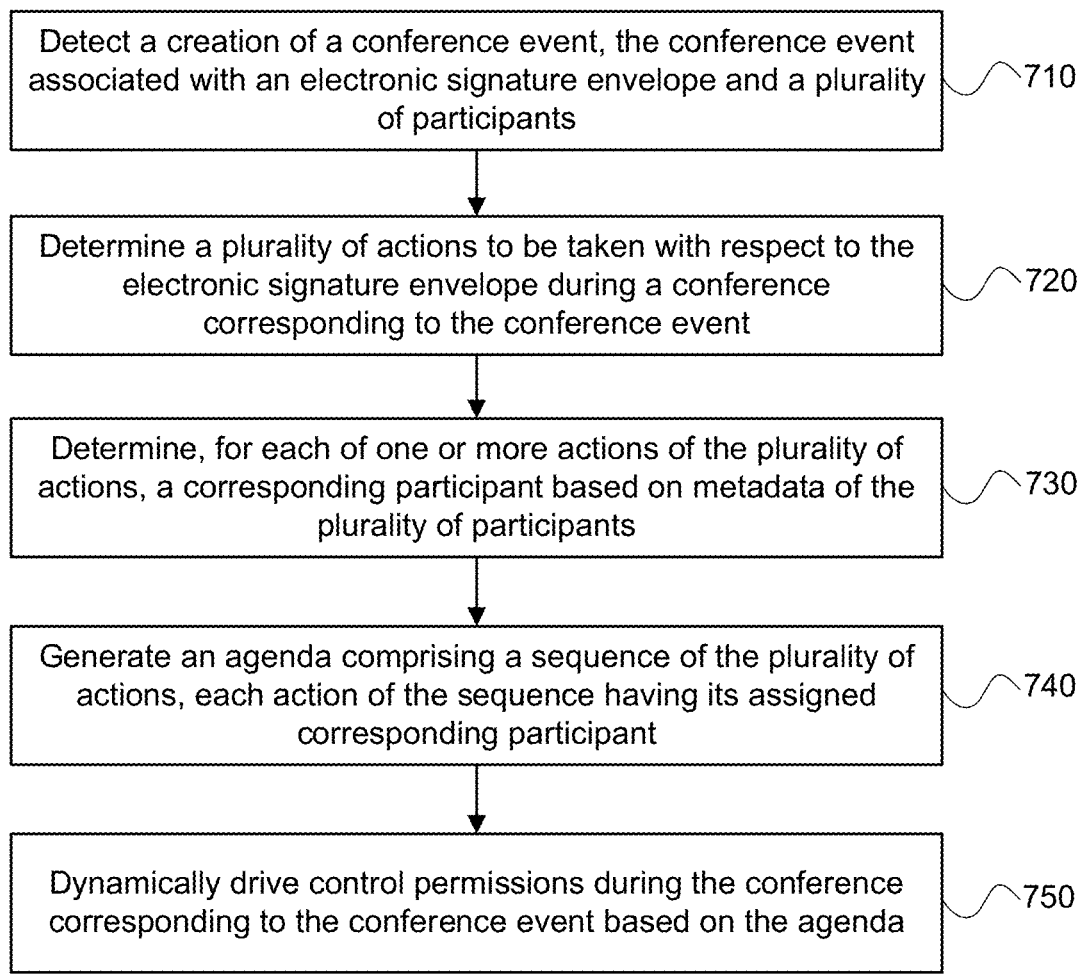
FIG. 7 is a flowchart illustrating a process for generating an agenda and driving control permissions based on the agenda, in accordance with some embodiments.

FIG. 7 is a flowchart illustrating process 700 for generating an agenda and driving control permissions based on the agenda, in accordance with some embodiments. Centralized document system 110 may perform process 700. In some embodiments, centralized document system 110 performs operations of process 700 in parallel or in different orders, or may perform different steps.

Centralized document system 110 detects 710 a creation of a conference event, the conference event associated with an electronic signature envelope and a plurality of participants. The conference event may be created in the form of an electronic invitation on a user device by a host participant operating a conferencing client on the user device to interact with video conferencing platform 115. The electronic invitation may be sent to a plurality of participants to the conference (e.g., a host and multiple invitees). The electronic invitation may include an electronic signature envelope that is managed by centralized document system 110 and that is to be executed by some or all of the participants to whom the electronic invitation is sent. The plurality of participants who receive the invitation including the electronic signature envelope may be authenticated (e.g., by authentication service 306 of FIG. 3A) prior to allowing the participant to access the envelope. The envelope may be executed during the conference corresponding to the conference event. The conferencing client may include front-end functionality to associate the envelope to the conference event. At the back-end, centralized document system 110 and video conferencing platform 115 may be configured to interact with each other based on user operation to create an integrated conference event that is hosted on video conferencing platform 115 and that is associated with an envelope managed by centralized document system 110.

Centralized document system 110 determines 720 a plurality of actions to be taken with respect to the electronic signature envelope during a conference corresponding to the conference event. Centralized document system 110 may analyze the envelope (e.g., identify predetermined tags in the document to be executed to detect all signature fields in the document where a participant is supposed to sign) and determine actions to be taken to complete execution of the envelope based on the analysis.

Centralized document system 110 determines 730, for each of one or more actions of the plurality of actions, a corresponding participant based on metadata of the plurality of participants. In some embodiments, for each action determined at block 720, centralized document system 110 may identify a corresponding participant (acting participant) for the action. Centralized document system 110 may utilize authorization data extracted from the envelope and further utilize information (metadata) regarding the plurality of participants associated with the conference event to determine the assigned participant for each action. The metadata may include organizational hierarchy data or historical signature activity data associated with the participants. Machine-learned models may be used to make the action-specific assignments.

Centralized document system 110 may generate 740 an agenda comprising a sequence of the plurality of actions, each action of the sequence having its assigned corresponding participant. The sequence may be generated based on preferences of a participant (e.g., host participant) and/or based on predetermined rules that may be based on a type of the envelope associated with the conference event and that may dictate actions that are prerequisites for other actions among the plurality of actions associated with the envelope. Machine-learned models may be used to generate the sequence based on, e.g., historical data indicating preferences of the host participant for completing the actions of the envelope.

Centralized document system 110 may dynamically drive 750 control permissions during the conference corresponding to the conference event based on the agenda. Based on the determined sequence, centralized document system 110 may control video conferencing platform 115 to selectively grant and revoke edit permissions to user devices associated with the respective participants who are assigned to the actions of the agenda, based on the sequence in which the actions are to be performed. Centralized document system 110 may thus cause transfer of edit permissions to interact with the envelope to seamlessly pass from one acting participant to the next in the order dictated based on the sequence of actions and the corresponding assigned participant for each action.

Figure 8:
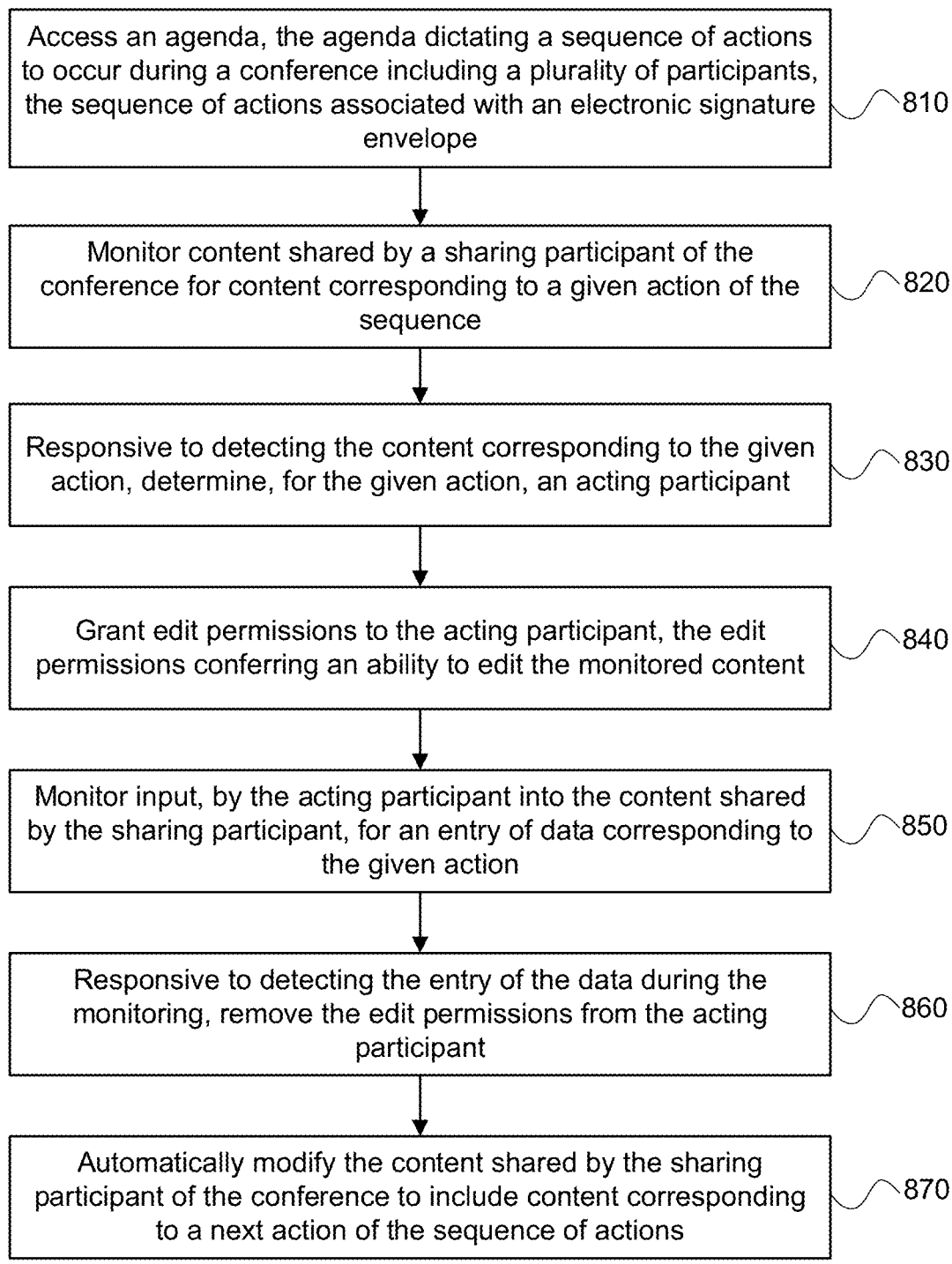
FIG. 8 is a flowchart illustrating a process for controlling edit permissions for participants to a conference based on an agenda, in accordance with some embodiments.

FIG. 8 is a flowchart illustrating a process 800 for controlling edit permissions for participants to a conference based on an agenda, in accordance with some embodiments. Centralized document system 110 may perform process 800. In some embodiments, centralized document system 110 performs operations of process 800 in parallel or in different orders, or may perform different steps.

Centralized document system 110 accesses 810 an agenda, the agenda dictating a sequence of actions to occur during a conference including a plurality of participants, the sequence of actions associated with an electronic signature envelope. The agenda generated based on the conference event may be stored in a datastore, and centralized document system 110 may access the agenda at the time of the conference associated with the conference event to execute the sequence of actions of the envelope.

Centralized document system 110 monitors 820 content shared by a sharing participant of the conference for content corresponding to a given action of the sequence. Based on the agenda and the sequence dictated by the agenda, centralized document system 110 may monitor a content feed associated with the conference and received from video conferencing platform 115 for content corresponding to a given action. For example, the sharing participant may access the envelope hosted on centralized document system 110 and share the envelope via their user device with other participants of the conference, so that each participant can view the shared content of the sharing participant on their respective user device. Centralized document system 110 may monitor the shared content shared by the sharing participant for content corresponding to a given action of the sequence (e.g., monitor whether the shared content viewed by conference participants corresponds to the given action content).

In response to detecting the content corresponding to the given action, centralized document system 110 determines 830, for the given action, an acting participant. Centralized document system 110 may access the agenda to determine who the acting participant for the given action of the envelope is. At block 830, centralized document system 110 may also determine whether the acting participant per the agenda is currently present in the conference (e.g., based on presence information of participants received from video conferencing platform 115).

Centralized document system 110 may grant 840 edit permissions to the acting participant, the edit permissions conferring an ability to edit the monitored content. Centralized document system 110 may grant the edit permission via an API layer by making an API call to video conferencing platform 115 instructing the platform to grant the edit permissions to the user device associated with the acting participant. The edit permissions may be limited so that the user device associated with the acting participant may only perform predetermined operations (e.g., populate a particular signature field, click a GUI button, etc.) with respect to the given action.

Centralized document system 110 may monitor 850 input, by the acting participant into the content shared by the sharing participant, for an entry of data corresponding to the given action. Centralized document system 110 may monitor input from the user device associated with the acting participant to whom the edit permissions have been granted, to determine if data entry corresponding to the predetermined permissible operations has been received from the user device of the acting participant. Responsive to detecting the entry of the data during the monitoring, centralized document system 110 removes 860 the edit permissions from the acting participant. Finally, centralized document system 110 automatically modifies 870 the content shared by the sharing participant of the conference to include content corresponding to a next action of the sequence of actions.

Figure 9:
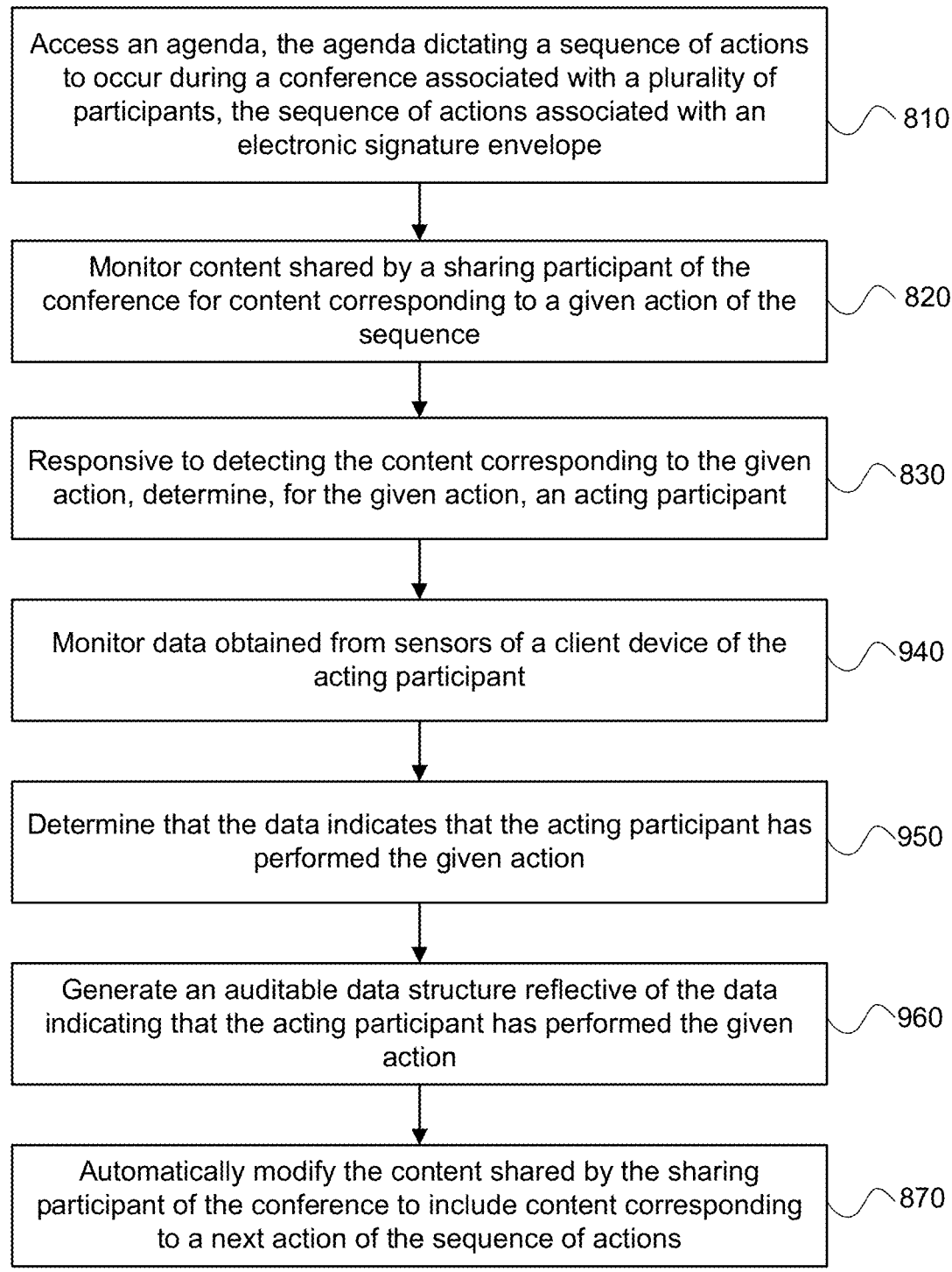
FIG. 9 is a flowchart illustrating a process for generating auditable data structures for participants to a conference, in accordance with some embodiments.

FIG. 9 is a flowchart illustrating a process 900 for generating auditable data structures for participants to a conference, in accordance with some embodiments. Centralized document system 110 may perform process 900. In some embodiments, centralized document system 110 performs operations of process 900 in parallel or in different orders, or may perform different steps. Steps of process 900 that are the same as those of process 800 are denoted by the same reference numerals in FIG. 9 and detailed description thereof is omitted here.

At block 940, responsive to detecting the content corresponding to the given action, centralized document system 110 may monitor 940 data obtained from sensors of a client device of the acting participant. Instead of interacting with the signature field of the envelope that corresponds to the given action, the acting participant may provide their assent by using gestures or verbal cues. To capture this assent, centralized document system 110 may access the sensor data from one or more sensors (e.g., camera, microphone) of the user device of the acting participant.

Centralized document system 110 may determine 950 that the data indicates that the acting participant has performed the given action. Centralized document system 110 may analyze the sensor data using assent tracking models (e.g., speech-to-text, NLP, NLU, etc.) to determine if the captured sensor data indicates assent of the acting participant. Centralized document system 110 may also employ machine-learned models that are trained to predict whether the gestures or verbal cues captured in the sensor data indicate assent of the acting participant.

Centralized document system 110 may then generate 960 an auditable data structure reflective of the data indicating that the acting participant has performed the given action. The auditable data structure may include a transcript snippet and/or an audio/video snippet that is stored by centralized document system 110 to create an audit trail associated with the envelope, so that the (verbal or gesture-based) assent of the acting participant can be verified and documented. Centralized document system 110 may annotate the envelope signature field associated with the given action with the corresponding generated auditable data structure so that a user can easily navigate from the signature field of the electronic document to the corresponding audio/video snippet or portion of the conference transcript.

ADDITIONAL CONFIGURATION CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Where values are described as "approximate" or "substantially" (or their derivatives), such values should be construed as accurate+/−10% unless another meaning is apparent from the context. From example, "approximately ten" should be understood to mean "in a range from nine to eleven." The term "substantially real time" should be understood to mean within 10% a second from real time unless another meaning is apparent from the context. For example, receiving a video feed in substantially real time may account for a lag of at most 0.1 seconds.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for operating a data management system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
   detecting, by one or more processors, a creation of a conference event, the conference event associated with an electronic signature envelope and a plurality of participants;
   determining, by the one or more processors, a plurality of actions to be taken with respect to the electronic signature envelope during a conference corresponding to the conference event;
   determining, by the one or more processors and for each action of one or more actions of the plurality of actions, a corresponding participant based on metadata of the plurality of participants;

generating, by the one or more processors, an agenda comprising a first sequence of the plurality of actions, each action of the first sequence of the plurality of actions having an assigned corresponding participant;

updating, by the one or more processors and based on input from a user during the conference, the agenda to update the first sequence to a second sequence of the plurality of actions, the second sequence being different from the first sequence; and dynamically driving, by the one or more processors, control permissions during the conference corresponding to the conference event based on the updated agenda.

2. The method of claim 1, further comprising:
determining presence information of the plurality of participants during the conference associated with the conference event; and
in response to determining that the corresponding participant assigned to a given one of the plurality of actions in the agenda is not present in the conference, performing a predetermined action.

3. The method of claim 2, wherein the predetermined action comprises one of transmitting a notification to a user or updating the corresponding participant associated with the given action.

4. The method of claim 1, further comprising inputting the first sequence of the plurality of actions into a machine-learned model that is specific to the user and that is trained to predict the second sequence of the plurality of actions.

5. The method of claim 4, wherein the machine-learned model is trained based on historical data of action sequence updates made by the user indicating the user's preference for a sequence in which to complete actions.

6. A method comprising:
detecting, by one or more processors, a creation of a conference event, the conference event associated with an electronic signature envelope and a plurality of participants;
determining, by the one or more processors, a plurality of actions to be taken with respect to the electronic signature envelope during a conference corresponding to the conference event;
determining, by the one or more processors and for each action of one or more actions of the plurality of actions, a corresponding participant based on metadata of the plurality of participants, wherein the metadata comprises organizational hierarchy data that includes identity data for a plurality of executive ranks of a plurality of entities, and wherein determining, for each action of the one or more actions, the corresponding participant comprises:
determining authorization data associated with a particular action of the one or more actions based on the electronic signature envelope;
accessing the organizational hierarchy data to obtain identity data corresponding to a given executive rank of a given entity based on the authorization data; and
determining the corresponding participant for the particular action based on the obtained identity data;
generating, by the one or more processors, an agenda comprising a sequence of the plurality of actions, each action of the sequence having an assigned corresponding participant; and
dynamically driving, by the one or more processors, control permissions during the conference corresponding to the conference event based on the agenda.

7. The method of claim 6, further comprising updating a portion of the electronic signature envelope associated with the particular action based on the determined corresponding participant.

8. The method of claim 6, wherein the authorization data associated with the particular action identifies a subset of the executive ranks as being authorized to complete the particular action, and wherein the method further comprises selecting one of the subset of the executive ranks as the given executive rank for obtaining the identity data.

9. A method comprising:
detecting, by one or more processors, a creation of a conference event, the conference event associated with an electronic signature envelope and a plurality of participants;
determining, by the one or more processors, a plurality of actions to be taken with respect to the electronic signature envelope during a conference corresponding to the conference event;
determining, by the one or more processors and for each action of one or more actions of the plurality of actions, a corresponding participant based on metadata of the plurality of participants, wherein determining, for each action of the one or more actions, the corresponding participant comprises:
analyzing the electronic signature envelope to determine a signatory role associated with a particular action of the one or more of actions;
analyzing the metadata of the plurality of participants to determine a participant role of each participant; and
selecting one of the plurality of participants as the corresponding participant for the particular action based on a match between the participant role of the corresponding participant and the signatory role associated with the particular action;
generating, by the one or more processors, an agenda comprising a sequence of the plurality of actions, each action of the sequence having an assigned corresponding participant; and
dynamically driving, by the one or more processors, control permissions during the conference corresponding to the conference event based on the agenda.

10. A method comprising:
detecting, by one or more processors, a creation of a conference event, the conference event associated with an electronic signature envelope and a plurality of participants;
determining, by the one or more processors, a plurality of actions to be taken with respect to the electronic signature envelope during a conference corresponding to the conference event;
determining, by the one or more processors and for each action of one or more actions of the plurality of actions, a corresponding participant based on metadata of the plurality of participants, wherein determining, for each action of the one or more actions, the corresponding participant comprises:
determining authorization data associated with a particular action of the one or more actions based on the electronic signature envelope;
inputting the authorization data into a machine-learned model trained to predict identity data; and
determining the corresponding participant for the particular action based on the predicted identity data;

generating, by the one or more processors, an agenda comprising a sequence of the plurality of actions, each action of the sequence having an assigned corresponding participant; and dynamically driving, by the one or more processors, control permissions during the conference corresponding to the conference event based on the agenda.

11. The method of claim 10, wherein the machine-learned model is trained to predict the identity data based on historical signature activity of the plurality of participants.

12. Non-transitory machine-readable media comprising instructions that, when executed by one or more processors, cause the one or more processors to:

detect a creation of a conference event, the conference event associated with an electronic signature envelope and a plurality of participants;

determine a plurality of actions to be taken with respect to the electronic signature envelope during a conference corresponding to the conference event;

determine, for each of one or more actions of the plurality of actions, a corresponding participant based on metadata of the plurality of participants;

generate an agenda comprising a first sequence of the plurality of actions, each action of the first sequence having an assigned corresponding participant;

update, based on input from a user during the conference, the agenda to update the first sequence to a second sequence of the plurality of actions, the second sequence being different from the first sequence; and dynamically drive control permissions during the conference corresponding to the conference event based on the updated agenda.

13. The non-transitory machine-readable media of claim 12, wherein the metadata comprises organizational hierarchy data that includes identity data for a plurality of executive ranks of a plurality of entities, and wherein the instructions to determine, for each of the one or more actions, the corresponding participant cause the one or more processors to:

determine authorization data associated with a particular action of the one or more actions based on the electronic signature envelope;

access the organizational hierarchy data to obtain identity data corresponding to a given executive rank of a given entity based on the authorization data; and determine the corresponding participant for the particular action based on the obtained identity data.

14. The non-transitory machine-readable media of claim 13, further comprising instructions that cause the one or more processors to update a portion of the electronic signature envelope associated with the particular action based on the determined corresponding participant.

15. The non-transitory machine-readable media of claim 12, wherein the instructions to determine, for each of the one or more actions, the corresponding participant cause the one or more processors to:

analyze the electronic signature envelope to determine a signatory role associated with a particular action of the one or more actions;

analyze the metadata of the plurality of participants to determine a participant role of each participant; and select one of the plurality of participants as the corresponding participant for the particular action based on a match between the participant role of the corresponding participant and the signatory role associated with the particular action.

16. The non-transitory machine-readable media of claim 12, wherein the instructions to determine, for each of the one or more actions, the corresponding participant cause the one or more processors to:

determine authorization data associated with a particular action of the one or more actions based on the electronic signature envelope;

input the authorization data into a machine-learned model trained to predict identity data; and determine the corresponding participant for the particular action based on the predicted identity data.

17. The non-transitory machine-readable media of claim 16, wherein the machine-learned model is trained to predict the identity data based on historical signature activity of the plurality of participants.

18. The non-transitory machine-readable media of claim 12, further comprising instructions that cause the one or more processors to:

determine presence information of the plurality of participants during the conference associated with the conference event; and in response to a determination that the corresponding participant assigned to a given one of the plurality of actions in the agenda is not present in the conference, perform a predetermined action comprising one of transmitting a notification to a user or updating the corresponding participant associated with the given action.

19. A system comprising:

one or more processors; and memory operatively coupled to the one or more processors and comprising instructions that, when executed by the one or more processors, cause the one or more processors to:

detect a creation of a conference event, the conference event associated with an electronic signature envelope and a plurality of participants;

determine a plurality of actions to be taken with respect to the electronic signature envelope during a conference corresponding to the conference event;

determine, for each action of one or more actions of the plurality of actions, a corresponding participant based on metadata of the plurality of participants;

generate an agenda comprising a first sequence of the plurality of actions, each action of the first sequence having an assigned corresponding participant;

update, based on input from a user during the conference, the agenda to update the first sequence to a second sequence of the plurality of actions, the second sequence being different from the first sequence; and dynamically drive control permissions during the conference corresponding to the conference event based on the updated agenda.

20. The system of claim 19, wherein the instructions to determine, for each of the one or more actions, the corresponding participant cause the one or more processors to:

analyze the electronic signature envelope to determine a signatory role associated with a particular action of the one or more actions;

analyze the metadata of the plurality of participants to determine a participant role of each participant; and select one of the plurality of participants as the corresponding participant for the particular action based on a match between the participant role of the corresponding participant and the signatory role associated with the particular action.

* * * * *